US012177644B2

(12) United States Patent
Peters et al.

(10) Patent No.: US 12,177,644 B2
(45) Date of Patent: Dec. 24, 2024

(54) SIGNALLING OF AUDIO EFFECT METADATA IN A BITSTREAM

(71) Applicant: QUALCOMM Incorporated, San Diego, CA (US)

(72) Inventors: Nils Gunther Peters, San Diego, CA (US); Shankar Thagadur Shivappa, San Diego, CA (US); S M Akramus Salehin, San Diego, CA (US); Jason Filos, San Diego, CA (US); Siddhartha Goutham Swaminathan, San Diego, CA (US); Ferdinando Olivieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/755,578

(22) PCT Filed: Oct. 29, 2020

(86) PCT No.: PCT/US2020/058026

§ 371 (c)(1),
(2) Date: May 2, 2022

(87) PCT Pub. No.: WO2021/091769

PCT Pub. Date: May 14, 2021

(65) Prior Publication Data

US 2022/0386060 A1 Dec. 1, 2022

(30) Foreign Application Priority Data

Nov. 4, 2019 (GR) .............................. 20190100493

(51) Int. Cl.
*H04S 7/00* (2006.01)

(52) U.S. Cl.
CPC .......... *H04S 7/302* (2013.01); *H04S 2400/11* (2013.01)

(58) Field of Classification Search
None
See application file for complete search history.

(56) References Cited

U.S. PATENT DOCUMENTS

2014/0247946 A1 9/2014 Sen et al.
2015/0245153 A1 8/2015 Malak et al.
(Continued)

FOREIGN PATENT DOCUMENTS

CN 106385512 A 2/2017
WO 2019004524 A1 1/2019
(Continued)

OTHER PUBLICATIONS

International Search Report and Written Opinion—PCT/US2020/058026—ISA/EPO—Feb. 18, 2021.

*Primary Examiner* — Kenny H Truong
(74) *Attorney, Agent, or Firm* — QUALCOMM Incorporated; Espartaco Diaz Hidalgo

(57) ABSTRACT

Methods, systems, computer-readable media, and apparatuses for manipulating a soundfield are presented. Some configurations include receiving a bitstream that comprises metadata and a soundfield description; parsing the metadata to obtain an effect identifier and at least one effect parameter value; and applying, to the soundfield description, an effect identified by the effect identifier. The applying may include using the at least one effect parameter value to apply the identified effect to the soundfield description.

28 Claims, 17 Drawing Sheets

(56) References Cited

U.S. PATENT DOCUMENTS

| | | | | |
|---|---|---|---|---|
| 2016/0227340 | A1* | 8/2016 | Peters | H04S 3/008 |
| 2017/0372748 | A1 | 12/2017 | McCauley et al. | |
| 2017/0373857 | A1* | 12/2017 | Schneider | H04N 21/4355 |
| 2020/0358415 | A1* | 11/2020 | Aoyama | H04S 7/302 |

FOREIGN PATENT DOCUMENTS

| | | | |
|---|---|---|---|
| WO | 2019013400 | A1 | 1/2019 |
| WO | 2019078035 | A1 | 4/2019 |

* cited by examiner

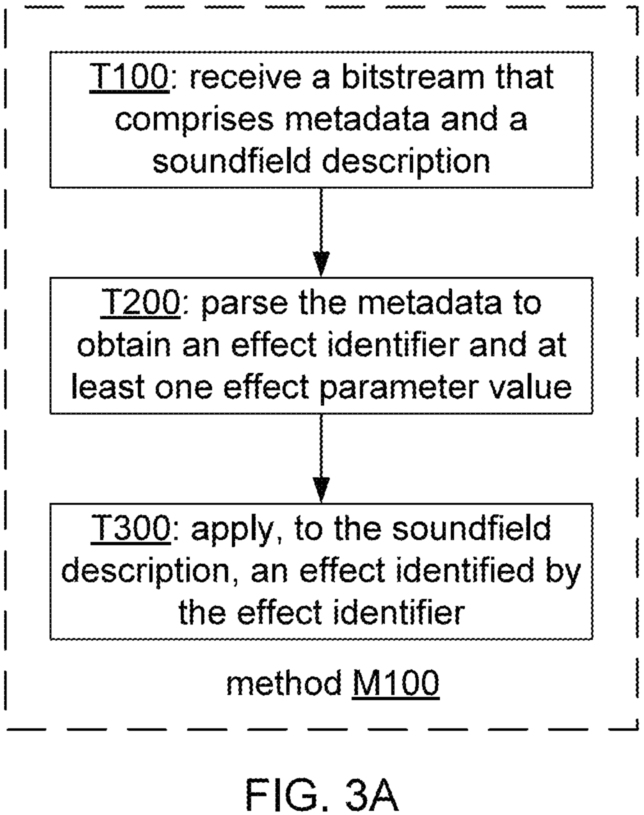
FIG. 3A
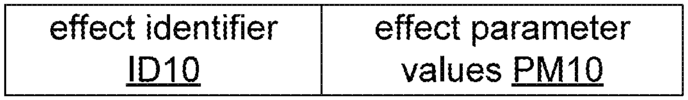
FIG. 3B
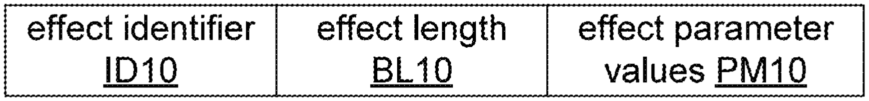
FIG. 3C
| EFFECT | EFFECT ID |
|---|---|
| focus | 000 |
| zoom | 001 |
| null | 010 |
| rotate | 011 |
| translate | 100 |
| Special mode 1 | 101 |
| Special mode 2 | 110 |
FIG. 3D

SIGNALLING OF AUDIO EFFECT METADATA IN A BITSTREAM

I. CROSS-REFERENCE TO RELATED APPLICATIONS

The present application claims priority from Greece Provisional Patent Application No. 20190100493, filed Nov. 4, 2019, entitled "SIGNALLING OF AUDIO EFFECT METADATA IN A BITSTREAM," which is incorporated by reference in its entirety.

II. FIELD OF THE DISCLOSURE

Aspects of the disclosure relate to audio signal processing.

III. BACKGROUND

The evolution of surround sound has made available many output formats for entertainment nowadays. The range of surround-sound formats in the market includes the popular 5.1 home theatre system format, which has been the most successful in terms of making inroads into living rooms beyond stereo. This format includes the following six channels: front left (L), front right (R), center or front center (C), back left or surround left (Ls), back right or surround right (Rs), and low frequency effects (LFE)). Other examples of surround-sound formats include the growing 7.1 format and the futuristic 22.2 format developed by NHK (Nippon Hoso Kyokai or Japan Broadcasting Corporation) for use, for example, with the Ultra High Definition Television standard. It may be desirable for a surround sound format to encode audio in two dimensions (2D) and/or in three dimensions (3D). However, these 2D and/or 3D surround sound formats require high-bit rates to properly encode the audio in 2D and/or 3D.

Beyond channel-based formats, new audio formats for enhanced reproduction are becoming available, such as, for example, object-based and scene-based (e.g., higher-order Ambisonics or HOA) codecs. An audio object encapsulates individual pulse-code-modulation (PCM) audio streams, along with their three-dimensional (3D) positional coordinates and other spatial information (e.g., object coherence) encoded as metadata. The PCM streams are typically encoded using, e.g., a transform-based scheme (for example, MPEG Layer-3 (MP3), AAC, MDCT-based coding). The metadata may also be encoded for transmission. At the decoding and rendering end, the metadata is combined with the PCM data to recreate the 3D sound field.

Scene-based audio is typically encoded using an Ambisonics format, such as B-Format. The channels of a B-Format signal correspond to spherical harmonic basis functions of the sound field, rather than to loudspeaker feeds. A first-order B-Format signal has up to four channels (an omnidirectional channel W and three directional channels X, Y, Z); a second-order B-Format signal has up to nine channels (the four first-order channels and five additional channels R, S, T, U, V); and a third-order B-Format signal has up to sixteen channels (the nine second-order channels and seven additional channels K, L, M, N, O, P, Q).

Advanced audio codecs (e.g., object-based codecs or scene-based codecs) may be used to represent the soundfield (i.e., the distribution of air pressure in space and time) over an area to support multi-directional and immersive reproduction. The incorporation of head-related transfer functions (HRTFs) during rendering may be used to enhance these qualities for headphones.

IV. BRIEF SUMMARY

A method of manipulating a soundfield according to a general configuration comprises receiving a bitstream that comprises metadata and a soundfield description; parsing the metadata to obtain an effect identifier and at least one effect parameter value; and applying, to the soundfield description, an effect identified by the effect identifier. The applying may include using the at least one effect parameter value to apply the identified effect to the soundfield description. Computer-readable storage media comprising code which, when executed by at least one processor, causes the at least one processor to perform such a method are also disclosed.

An apparatus for manipulating a soundfield according to a general configuration includes a decoder configured to receive a bitstream that comprises metadata and a soundfield description and to parse the metadata to obtain an effect identifier and at least one effect parameter value; and a renderer configured to apply, to the soundfield description, an effect identified by the effect identifier. The renderer may be configured to use the at least one effect parameter value to apply the identified effect to the soundfield description. Apparatus comprising a memory configured to store computer-executable instructions and a processor coupled to the memory and configured to execute the computer-executable instructions to perform such parsing and rendering operations are also disclosed.

V. BRIEF DESCRIPTION OF THE DRAWINGS

Aspects of the disclosure are illustrated by way of example. In the accompanying figures, like reference numbers indicate similar elements.

FIG. 3A shows a flowchart of a method M100 according to a general configuration.

FIG. 3B shows an example of two metadata fields relating to an audio effect.

FIG. 3C shows an example of three metadata fields relating to an audio effect.

FIG. 3D shows an example of a table of values for an effect identifier metadata field.

VI. DETAILED DESCRIPTION

A soundfield as described herein may be two-dimensional (2D) or three-dimensional (3D). One or more arrays used to capture a soundfield may include a linear array of transducers. Additionally or alternatively, the one or more arrays may include a spherical array of transducers. One or more arrays may also be positioned within the scene space, and such arrays may include arrays having fixed positions and/or arrays having positions that may change during an event (e.g., that are mounted on people, wires, or drones). For example, one or more arrays within the scene space may be mounted on people participating in the event such as players and/or officials (e.g., referees) in a sports event, performers and/or an orchestra conductor in a music event, etc.

Figure 14:
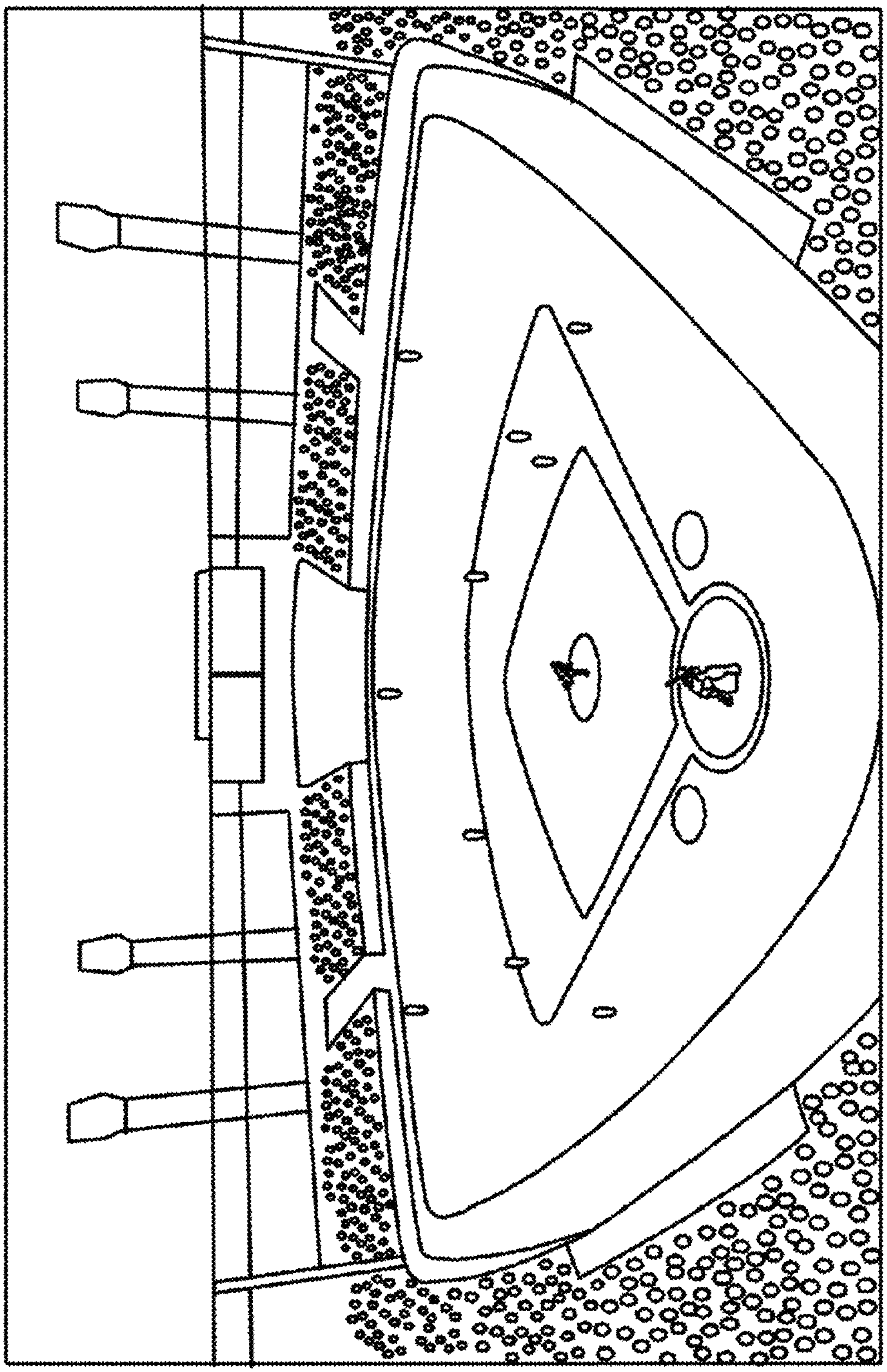
FIG. 14 shows an example of a scene space.

A soundfield may be recorded using multiple distributed arrays of transducers (e.g., microphones) in order to capture spatial audio over a large scene space (e.g., a baseball stadium as shown in FIG. 14, a football field, a cricket field, etc.). For example, the capture may be performed using one or more arrays of sound-sensing transducers (e.g., microphones) that are positioned outside the scene space (e.g., along a periphery of the scene space). The arrays may be positioned (e.g., directed and/or distributed) so that certain regions of the soundfield are sampled more or less densely than other regions (e.g., depending on the importance of the region of interest). Such positioning may change over time (e.g., to correspond with changes in the focus of interest). Arrangements can vary depending on the size of the field/type of field or to have maximum coverage and reduce blind spots. A generated soundfield may include audio that has been captured from another source (e.g., a commentator within a broadcasting booth) and is being added to the soundfield of the scene space.

Audio formats that provide for more accurate modeling of a soundfield (e.g., object- and scene-based codecs) may also allow for spatial manipulation of the soundfield. For example, a user may prefer to alter the reproduced soundfield in any one or more of the following aspects: to make sound arriving from a particular direction louder or softer as compared to sound arriving from other directions; to hear sound arriving from a particular direction more clearly as compared to sound arriving from other directions; to hear sound from only one direction and/or to mute sound from a particular direction; to rotate the soundfield; to move a source within the soundfield; to move the user's location within the soundfield. User selection or modification as described herein may be performed, for example, using a mobile device (e.g., a smartphone), a tablet, or any other interactive device or devices.

Figure 1:
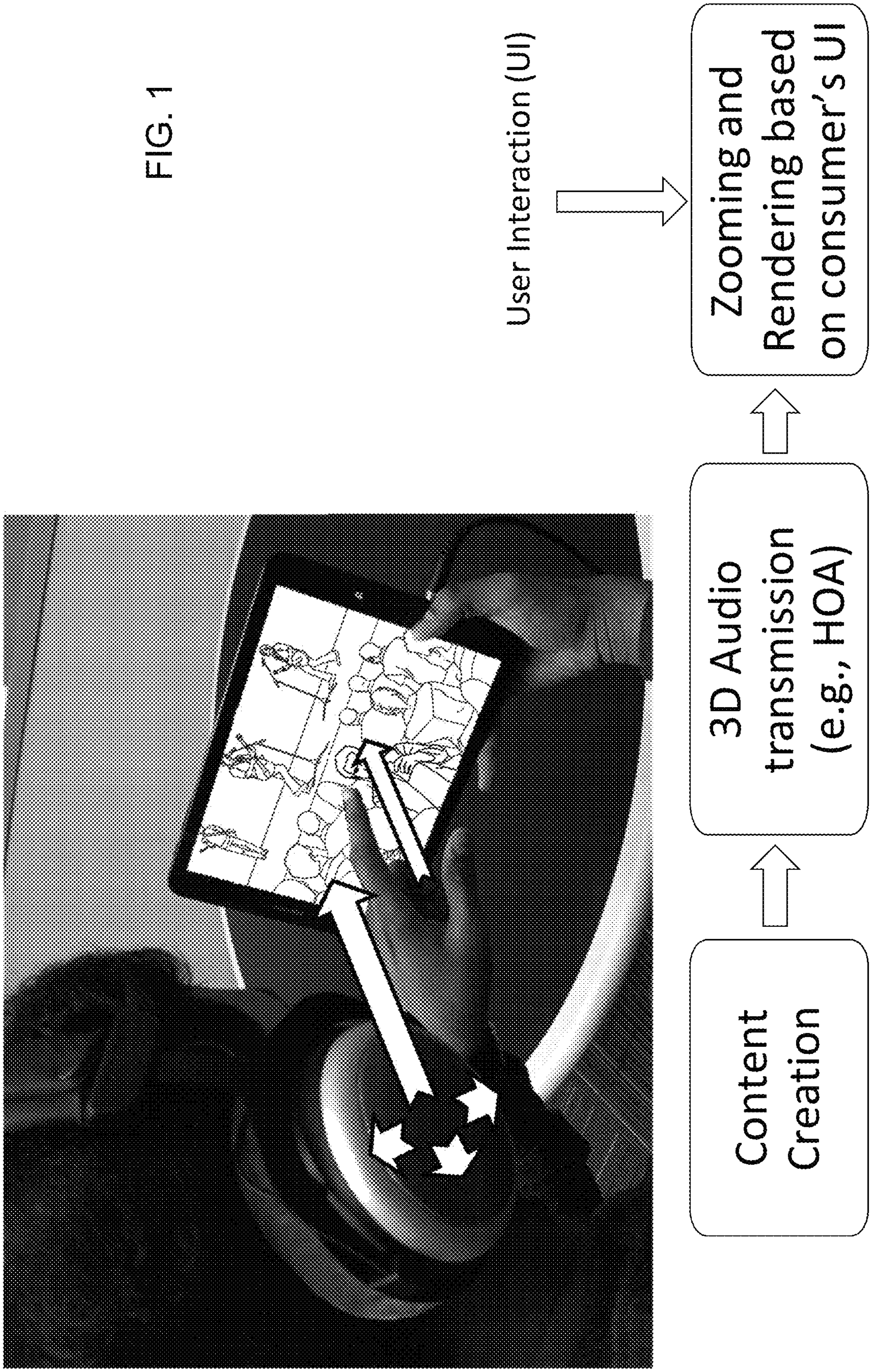
FIG. 1 shows an example of user direction for manipulation of a soundfield.

Such user interaction or direction (e.g., soundfield rotation, zooming into the audio scene) may be performed in a manner that is similar to selecting an area of interest in an image or video (as shown in FIG. 1, for example). A user may indicate a desired audio manipulation on a touchscreen, for example, by performing a spread ("reverse pinch" or "pinch open") or touch-and-hold gesture to indicate a desired zoom, a touch-and-drag gesture to indicate a desired rotation, etc. A user may indicate a desired audio manipulation by hand gesture (e.g., for optical and/or sonic detection) by moving her fingers or hands apart in a desired direction to indicate zoom, by performing a grasp-and-move gesture to indicate a desired rotation, etc. A user may indicate a desired audio manipulation by changing the position and/or orientation of a handheld device capable of recording such changes, such as a smartphone or other device equipped with an inertial measurement unit (IMU) (e.g., including one or more accelerometers, gyroscopes, and/or magnetometers).

Figure 2A:
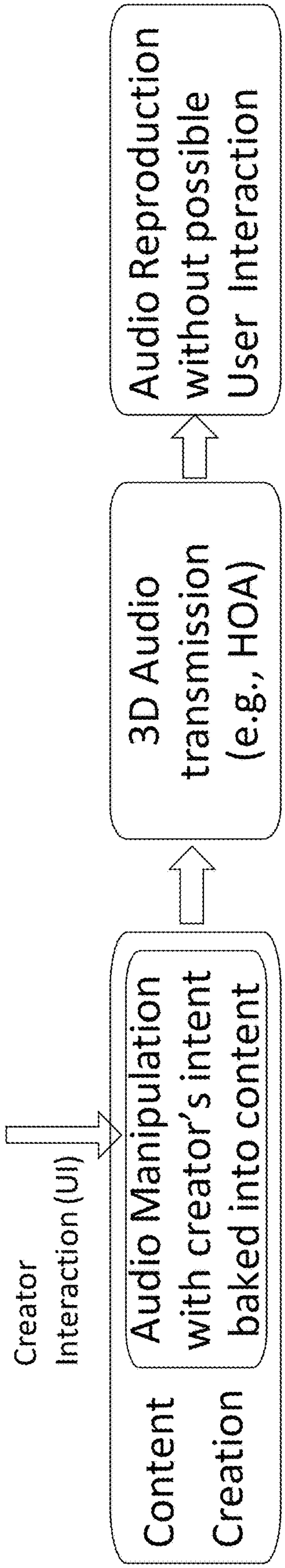
FIG. 2A illustrates a sequence of audio content production and reproduction.

Although audio manipulation (e.g., zooming, focus) is described above as a consumer side-only process, it may be desirable for a content creator to be able to apply such effects during production of media content that includes a soundfield. Examples of such produced content may include recordings of live events, such as sports or musical performances, as well as recordings of scripted events, such as movies or plays. The content may be audiovisual (e.g., a video or movie) or audio only (e.g., a sound recording of a music concert) and may include one or both of recorded (i.e. captured) audio and generated (e.g., synthetic, meaning synthesized rather than captured) audio. A content creator may desire to manipulate a recorded and/or generated soundfield for any of various reasons, such as for dramatic effect, to provide emphasis, to direct a listener's attention, to improve intelligibility, etc. The product of such processing is audio content (e.g., a file or bitstream) having the intended audio effect baked-in (as shown in FIG. 2A).

While producing audio content in such form may ensure that the soundfield can be reproduced as the content creator intended, such production may also impede a user from being able to experience other aspects of the soundfield as originally recorded. For example, the result of a user's attempt to zoom into an area of the soundfield may be suboptimal, as audio information for that area may no longer be available within the produced content. Producing the audio content in this manner may also prevent consumers from being able to reverse the creator's manipulations and may even prevent the content creator from being able to modify the produced content in a desired manner. For example, a content creator may be dissatisfied with the audio manipulation and may want to change the effect in retrospect. As audio information necessary to support such a change may have been lost during the production, being able to alter the effects after production may require that the original soundfield has been stored separately as a backup (e.g., may require the creator to maintain a separate archive of the soundfield before the effects were applied).

Figure 2B:
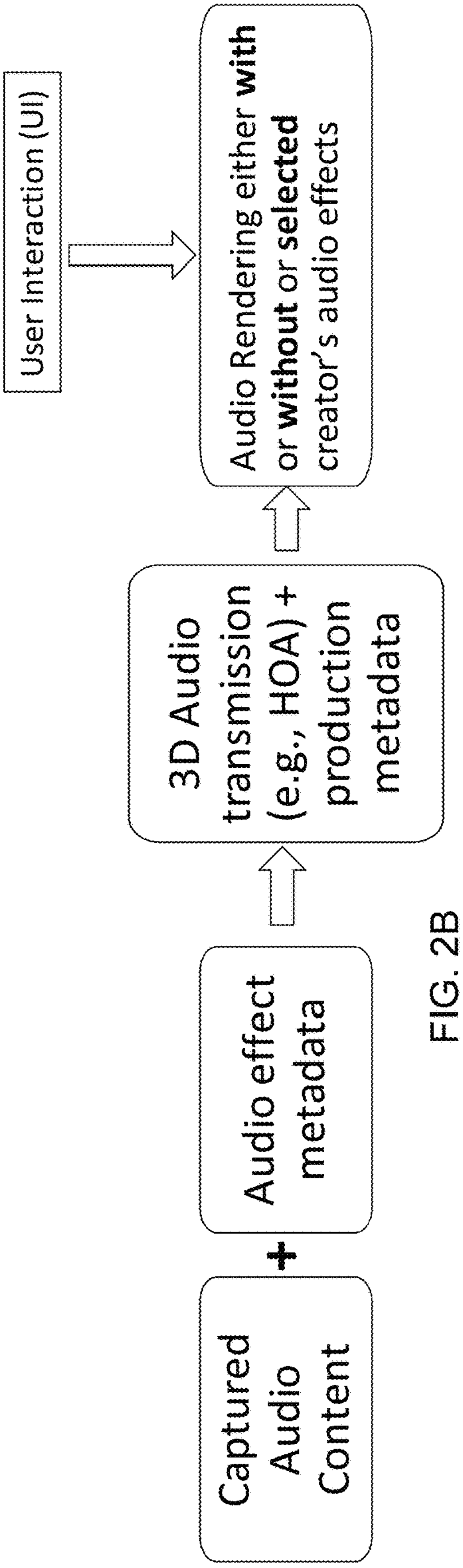
FIG. 2B illustrates a sequence of audio content production and reproduction according to a general configuration.

Systems, methods, apparatus, and devices as disclosed herein may be implemented to signal intended audio manipulations as metadata. For example, the captured audio content may be stored in a raw format (i.e., without the intended audio effect), and a creator's intended audio effect behavior may be stored as metadata in the bitstream. A consumer of the content may decide if she wants to listen to the raw audio or to hear the audio with the intended creator's audio effect (as shown in FIG. 2B). If the consumer selects the version of the creator's audio effect, then the audio rendering will process audio based on the signaled audio effect behavior metadata. If the consumer selects the raw version, the consumer may also be permitted to freely apply audio effects onto the raw audio stream.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

FIG. 3A shows a flowchart of a method M100 of manipulating a soundfield according to a general configuration that includes tasks T100, T200, and T300. Task T100 receives a bitstream that comprises metadata (e.g., one or more metadata streams) and a soundfield description (e.g., one or more audio streams). For example, the bitstream may comprise separate audio and metadata streams that are formatted to be compliant with International Telecommunications Union Recommendation (ITU-R) BS 2076-1 (Audio Definition Model, June 2017).

The soundfield description may include different audio streams for different regions based on, e.g., predetermined areas of interest inside the soundfield (for example, an object-based scheme for some regions and an HOA scheme for other regions). It may be desirable, for example, to use an object-based or HOA scheme to encode a region having a high degree of wavefield concentration, and to use HOA or a plane-wave expansion to encode a region having a low degree of wavefield concentration (e.g. ambience, crowd noise, clapping).

An object-based scheme may reduce a sound source to a point source, and directivity patterns (e.g., the variation with respect to direction of the sound emitted by, for example, a shouting player or a trumpet player) may not be preserved. HOA schemes (more generally, an encoding scheme based on a hierarchical set of basis function coefficients) are typically efficient at encoding large numbers of sound sources than object-based schemes (e.g., more objects can be represented by smaller HOA coefficients as compared to an object-based scheme). Benefits of using an HOA scheme may include being able to evaluate and/or represent the soundfield at different listener positions without the need to detect and track individual objects. Rendering of an HOA-encoded audio stream is typically flexible and agnostic to loudspeaker configuration. HOA encoding is also typically valid under free-field conditions, such that translation of a user's virtual listening position can be performed within a valid region close to the nearest source.

Task T200 parses the metadata to obtain an effect identifier and at least one effect parameter value. Task T300 applies, to the soundfield description, an effect identified by the effect identifier. The information which is signaled in the metadata stream may include the type of audio effect to be applied to the soundfield: e.g., one or more of any of a focus, a zoom, a null, a rotation, and a translation. For each effect that is to be applied, the metadata may be implemented to include a corresponding effect identifier ID10 which identifies the effect (e.g., a different value for each of zoom, null, focus, rotate, and translate; a mode indicator to indicate a desired mode, such as a conference or meeting mode; etc.). FIG. 3D shows one example of a table of values for effect identifier ID10 which assigns a unique identifier value to each of a number of different audio effects and also provides for signaling of one or more special configurations or modes (e.g., a conferencing or meeting mode as described below; a transition mode such as, e.g., fade-in or fade-out; a mode for mixing out one or more sound sources and/or mixing in one or more additional sound sources; a mode to enable or disable reverberation and/or equalization; etc.).

For each identified effect, the metadata may include a corresponding set of effect parameter values PM10 for parameters that define how the identified effect is to be applied (e.g., as shown in FIG. 3B). Such parameters may include, for example, an indication of the area of interest for the associated audio effect (such as spatial direction and size and/or width of the area); one or more values for effect-specific parameters (e.g., strength of focus effect); etc. Examples of these parameters are discussed in more detail below with reference to specific effects.

It may be desirable to allocate more bits of the metadata stream to carry parameter values for one effect than for another effect. In one example, the number of bits allocated for the parameter values for each effect is a fixed value of the encoding scheme. In another example, the number of bits allocated for the parameter values for each identified effect is indicated within the metadata stream (e.g., as shown in FIG. 3C).

Figure 4A:
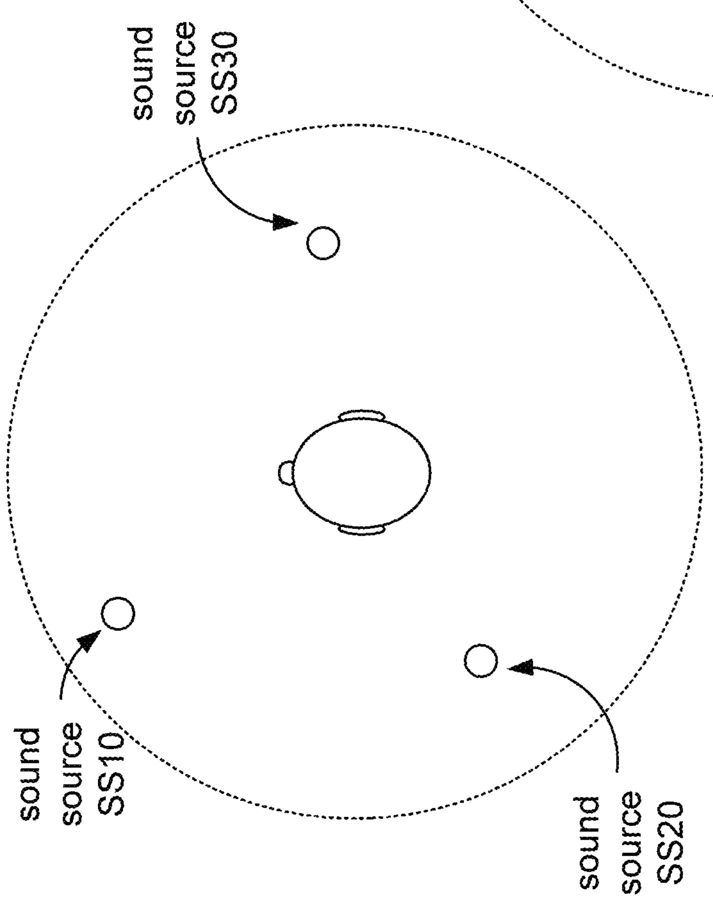
FIG. 4A shows an example of a soundfield that includes three sound sources.
Figure 4B:
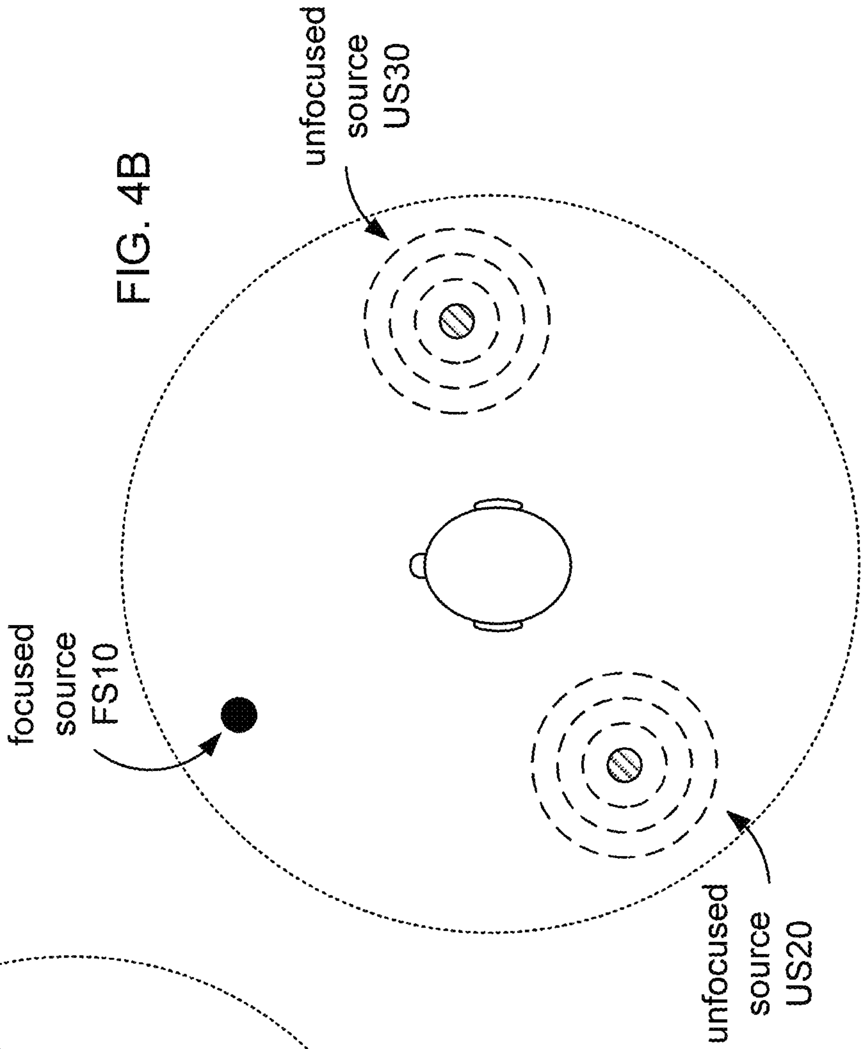
FIG. 4B shows a result of performing a focus operation on the soundfield of FIG. 4A.

A focus effect may be defined as an enhanced directionality of a particular source or region. Parameters defining how a desired focus effect is to be applied may include a direction of the focus region or source, a strength of the focus effect, and/or a width of the focus region. The direction may be indicated in three dimensions, for example, as the azimuth angle and the angle of elevation corresponding to the center of the region or source. In one example, a focus effect is applied during rendering by decoding the source or region of focus at a higher HOA order (more generally, by adding one or more levels of the hierarchical set of basis function coefficients) and/or by decoding other sources or regions at a lower HOA order. FIG. 4A shows an example of a soundfield to which a focus on source SS10 is to be applied, and FIG. 4B shows an example of the same soundfield after the focus effect is applied (it is noted that the sound sources shown in the soundfield figures herein may indicate, for example, audio objects in an object-based representation or virtual sources in a scene-based representation). In this example, the focus effect is applied by increasing a directionality of source SS10 and increasing a diffusivity of the other sources SS20 and SS30.

A zoom effect may be applied to boost an acoustic level of the soundfield in a desired direction. Parameters defining how a desired zoom effect is to be applied may include a direction of the region to be boosted. This direction may be indicated in three dimensions, for example, as the azimuth angle and the angle of elevation corresponding to the center of the region. Other parameters defining the zoom effect which may be included in the metadata may include one or both of a strength of the level boost and a size (e.g., width) of the region to be boosted. For a zoom effect that is implemented using a beamformer, the defining parameters may include selection of a beamformer type (e.g., FIR or IIR); selection of a set of beamformer weights (e.g., one or more series of tap weights); time-frequency masking values; etc.

A null effect may be applied to reduce an acoustic level of the soundfield in a desired direction. The parameters defining how a desired null effect is to be applied may be similar to those defining how a desired zoom effect is to be applied.

Figure 5B:
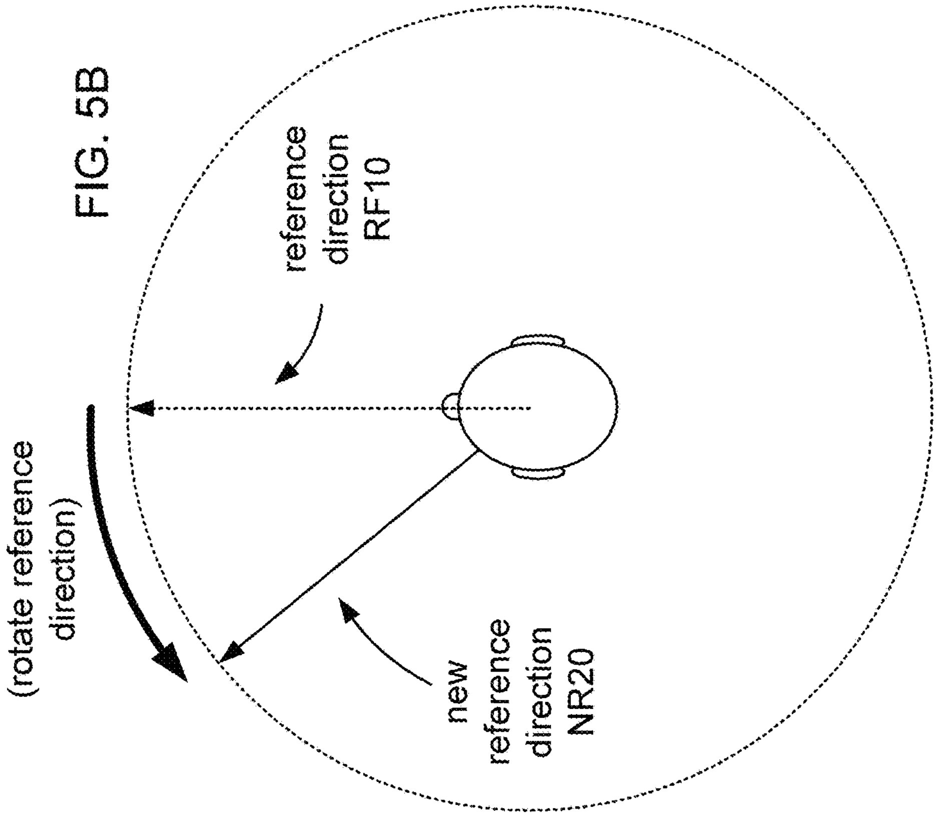
FIG. 5B shows an example of displacing a reference direction of a soundfield into a different direction.
Figure 5A:
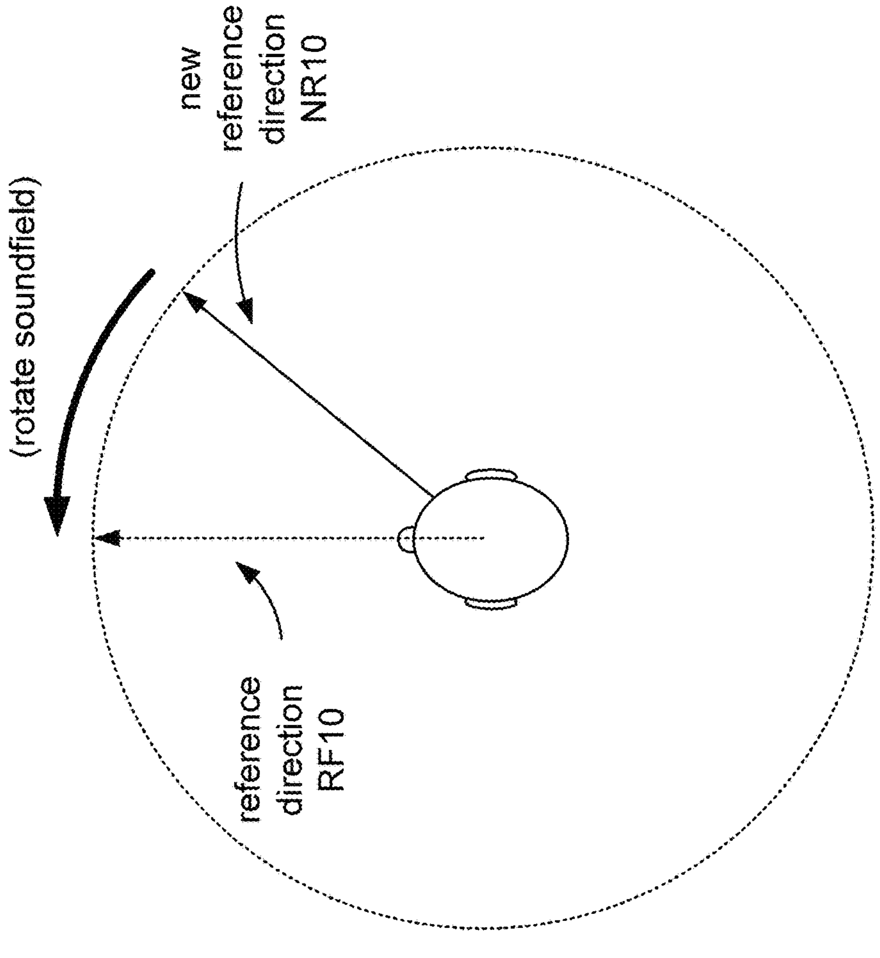
FIG. 5A shows an example of rotating a soundfield with respect to a reference direction.

A rotation effect may be applied by rotating the soundfield to a desired orientation. Parameters defining a desired rotation of the soundfield may indicate the direction which is to be rotated into a defined reference direction (e.g., as shown in FIG. 5A). Alternatively, the desired rotation may be indicated as a rotation of the reference direction to a different specified direction within the soundfield (e.g., as shown equivalently in FIG. 5B).

Figure 6B:
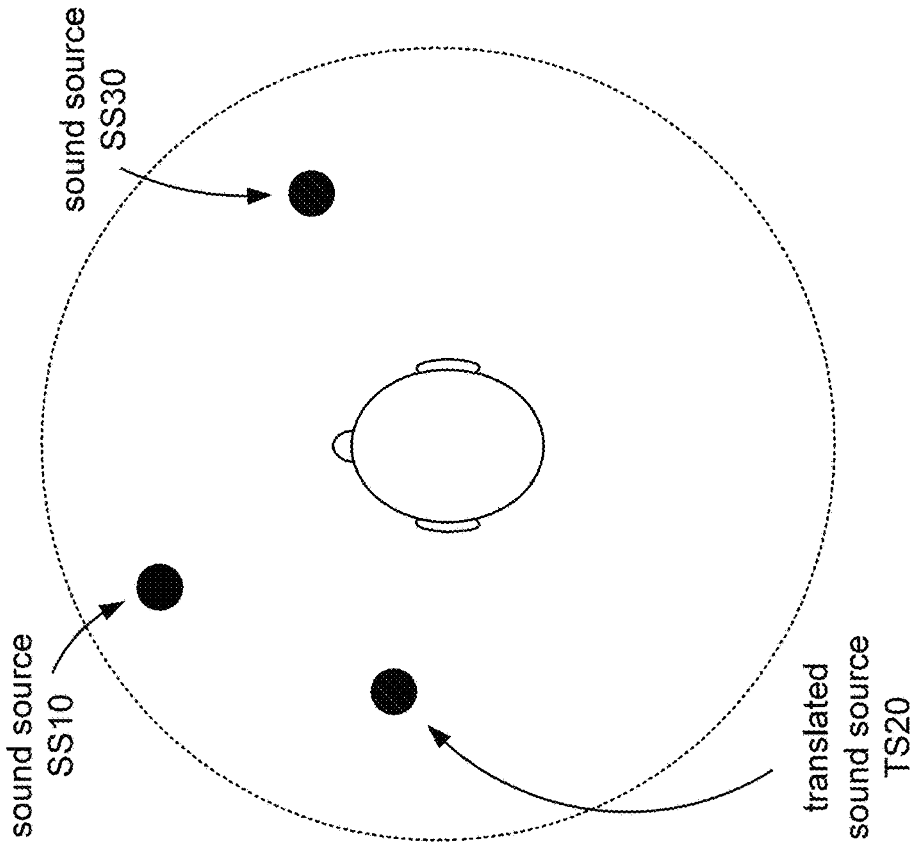
FIG. 6B shows a result of applying the desired translation to the soundfield of FIG. 6A.
Figure 6A:
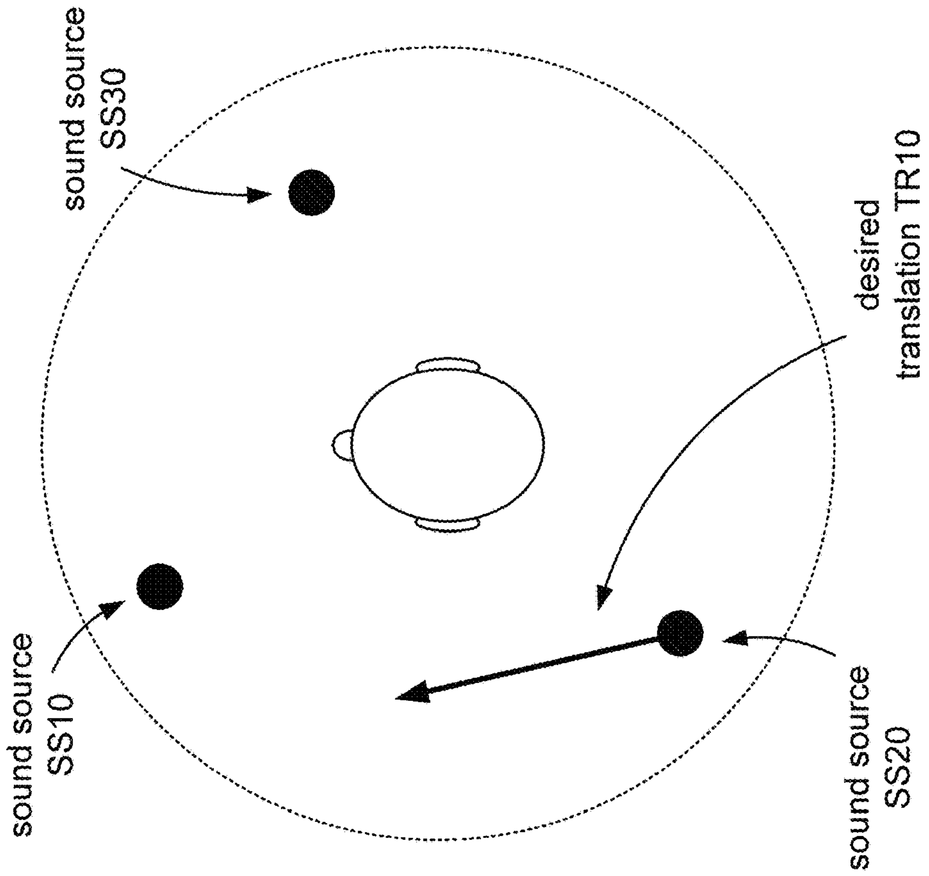
FIG. 6A shows an example of a soundfield and a desired translation of a user position.

A translation effect may be applied to translate a sound source to a new location within the soundfield. Parameters defining a desired translation may include a direction and a distance (alternatively, an angle of rotation relative to the user position). FIG. 6A shows an example of a soundfield having three sound sources SS10, SS20, SS30 and a desired translation TR10 of source SS20; and FIG. 6B shows the soundfield after translation TR10 is applied.

Figure 7A:
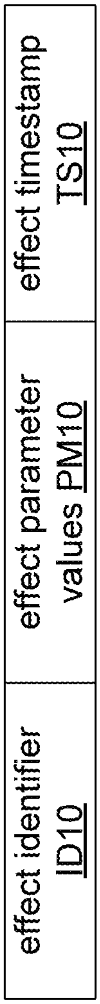
FIG. 7A shows an example of three metadata fields relating to an audio effect.
Figure 7B:
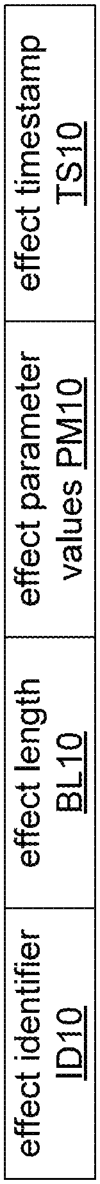
FIG. 7B shows an example of four metadata fields relating to an audio effect.

Each soundfield modification indicated in the metadata may be linked to a particular moment of the soundfield stream (e.g., by a timestamp included in the metadata, as shown in FIGS. 7A and 7B). For an implementation in which more than one soundfield modification is indicated under a shared timestamp, the metadata may also include information to identify a time precedence among the modifications (e.g., "apply the indicated rotation effect to the soundfield, then apply the indicated focus effect to the rotated soundfield").

Figure 8B:
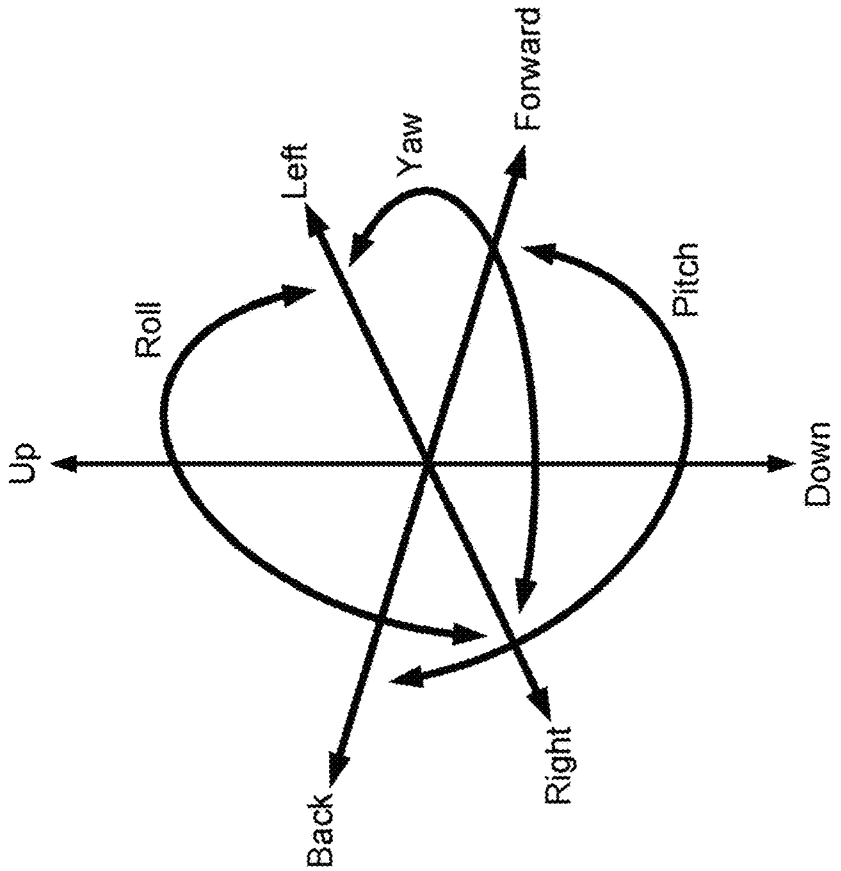
FIG. 8B illustrates motion (e.g., of a user) in six degrees of freedom (6DOF).
Figure 8A:
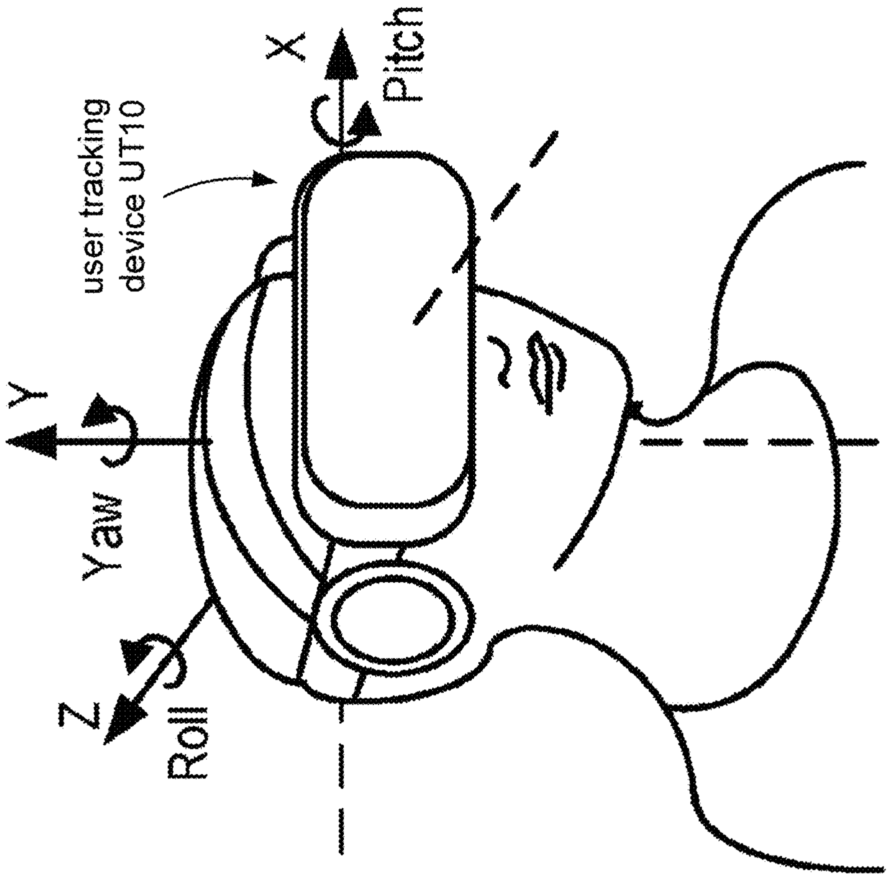
FIG. 8A shows an example of a user wearing a user tracking device.

As noted above, it may be desirable to enable a user to select a raw version of the soundfield or a version modified by the audio effects metadata, and/or modify the soundfield in a manner that is partially or completely different from the effects indicated in the effects metadata. A user may indicate such a command actively: for example, on a touchscreen, by gesture, by voice command, etc. Alternatively or additionally, a user command may be produced by passive user interaction via a device that tracks movement and/or orientation of the user: for example, a user tracking device that may include an inertial measurement unit (IMU). FIG. 8A shows one example UT10 of such a device that also includes a display screen and headphones. An IMU may include one or more accelerometers, gyroscopes, and/or magnetometers to indicate and quantify movement and/or orientation.

Figure 7C:
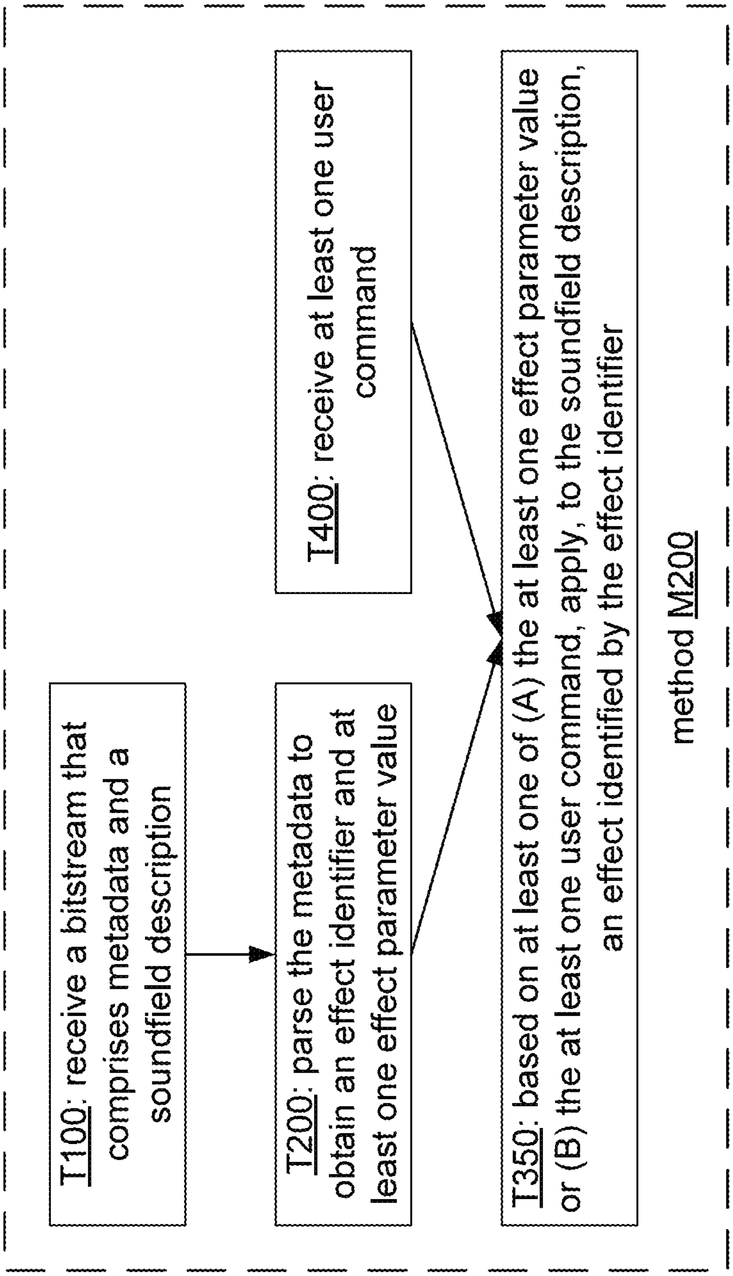
FIG. 7C shows a block diagram of an implementation M200 of method M100.

FIG. 7C shows a flowchart of an implementation M200 of method M100 that includes task T400 and an implementation T350 of task T300. Task T400 receives at least one user command (e.g., by active and/or passive user interaction). Based on at least one of (A) the at least one effect parameter value or (B) the at least one user command, task T350 applies, to the soundfield description, an effect identified by the effect identifier. Method M200 may be performed, for example, by an implementation of user tracking device UT10 that receives the audio and metadata streams and produces corresponding audio to the user via headphones.

In order to support an immersive VR experience, it may be desirable to adjust a provided audio environment in response to changes in the listener's virtual position. For example, it may be desirable to support virtual movement in six degrees of freedom (6DOF). As shown in FIGS. 8A and 8B, 6DOF includes the three rotational movements of 3DOF and also three translational movements: forward/backward (surge), up/down (heave), and left/right (sway). Examples of 6DOF applications include virtual attendance of a spectator event, such as a sports event (e.g., a baseball game), by a remote user. For a user wearing a device such as user tracking device UT10, it may be desirable to perform soundfield rotation according to passive user commands as produced by device UT10 (e.g., indicating the current forward look direction of the user as the desired reference direction for the soundfield) rather than according to a rotation effect indicated by the content creator in a metadata stream as described above.

It may be desirable to allow a content creator to limit the degree to which effects described in the metadata may be changed downstream. For example, it may be desirable to impose a spatial restriction to permit a user to apply an effect only in a specific area and/or to prevent a user from applying an effect in a specific area. Such a restriction may apply to all signaled effects or to a particular set of effects, or a restriction may apply to only a single effect. In one example, a spatial restriction permits a user to apply a zoom effect only in a specific area. In another example, a spatial restriction prevents a user from applying a zoom effect in another specific area (e.g., a confidential and/or private area). In another example, it may be desirable to impose a time restriction to permit a user to apply an effect only during a specific interval and/or to prevent a user from applying an effect during a specific interval. Again, such a restriction may apply to all signaled effects or to a particular set of effects, or a restriction may apply to only a single effect.

To support such restriction, the metadata may include a flag to indicate a desired restriction. For example, a restriction flag may indicate whether one or more (possibly all) of the effects indicated in the metadata may be overwritten by user interaction. Additionally or alternatively, a restriction flag may indicate whether user alteration of the soundfield is permitted or disabled. Such disabling may apply to all effects, or one or more effects may be specifically enabled or disabled. A restriction may apply to the entire file or bitstream or may be associated with a particular period of time within the file or bitstream. In another example, the effect identifier may be implemented to use different values to distinguish a restricted version of an effect (e.g., which may not be removed or overwritten) and an unrestricted version of the same effect (which may be applied or ignored according to the consumer's choice).

Figures 9A, 9B, 9C, 9D:
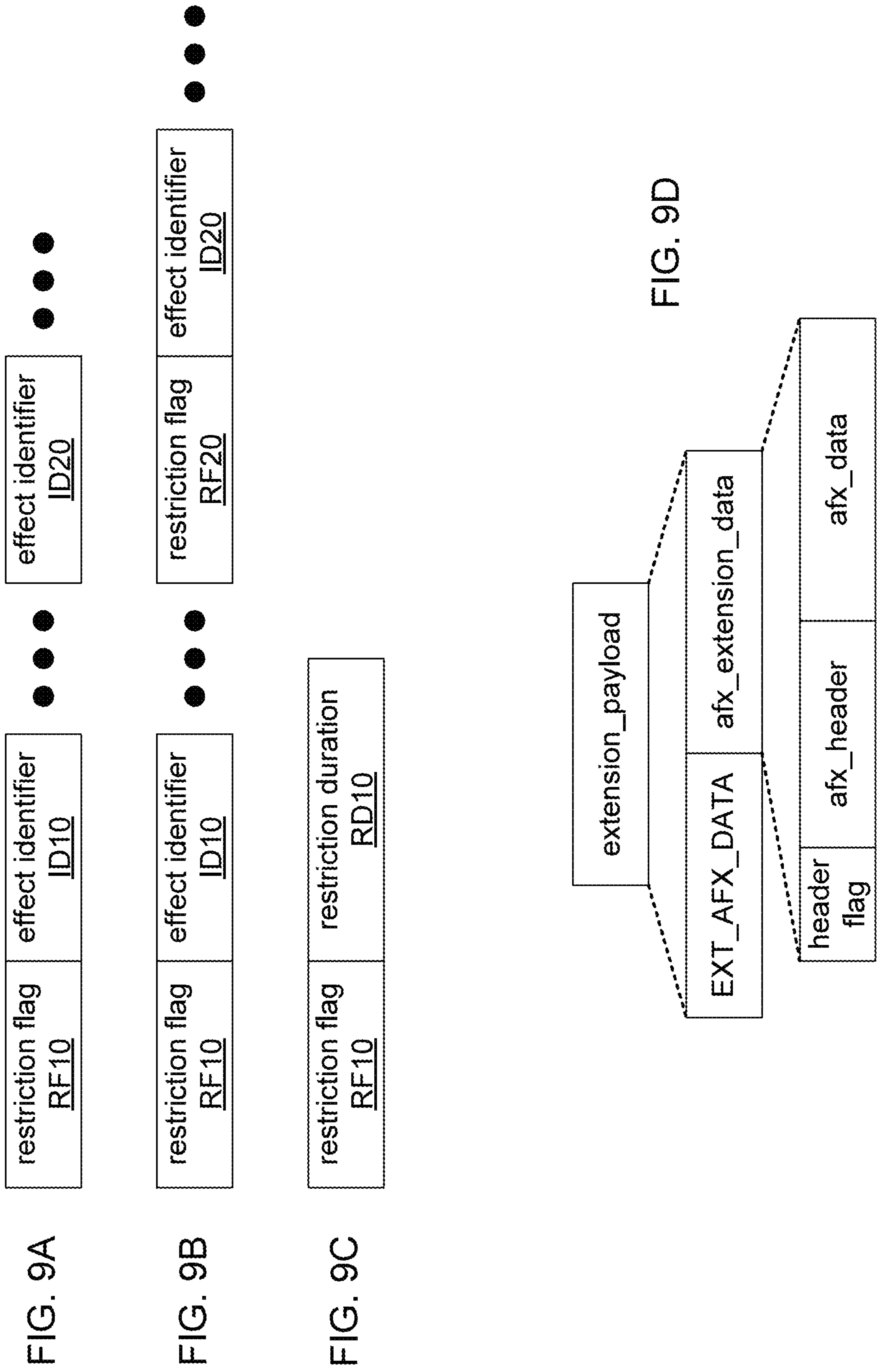
FIG. 9A shows an example of a restriction flag metadata field associated with multiple effect identifiers.
FIG. 9B shows an example of multiple restriction flag metadata fields, each associated with a corresponding effect identifier.
FIG. 9C shows an example of a restriction flag metadata field associated with a duration metadata field.
FIG. 9D shows an example of encoding audio effects metadata within an extension payload.

FIG. 9A shows an example of a metadata stream in which a restriction flag RF10 applies to two identified effects. FIG. 9B shows an example of a metadata stream in which separate restriction flags apply to each of two different effects. FIG. 9C shows an example in which a restriction flag is accompanied in the metadata stream by a restriction duration RD10 that indicates the duration of time for which the restriction is in effect.

Figure 10:
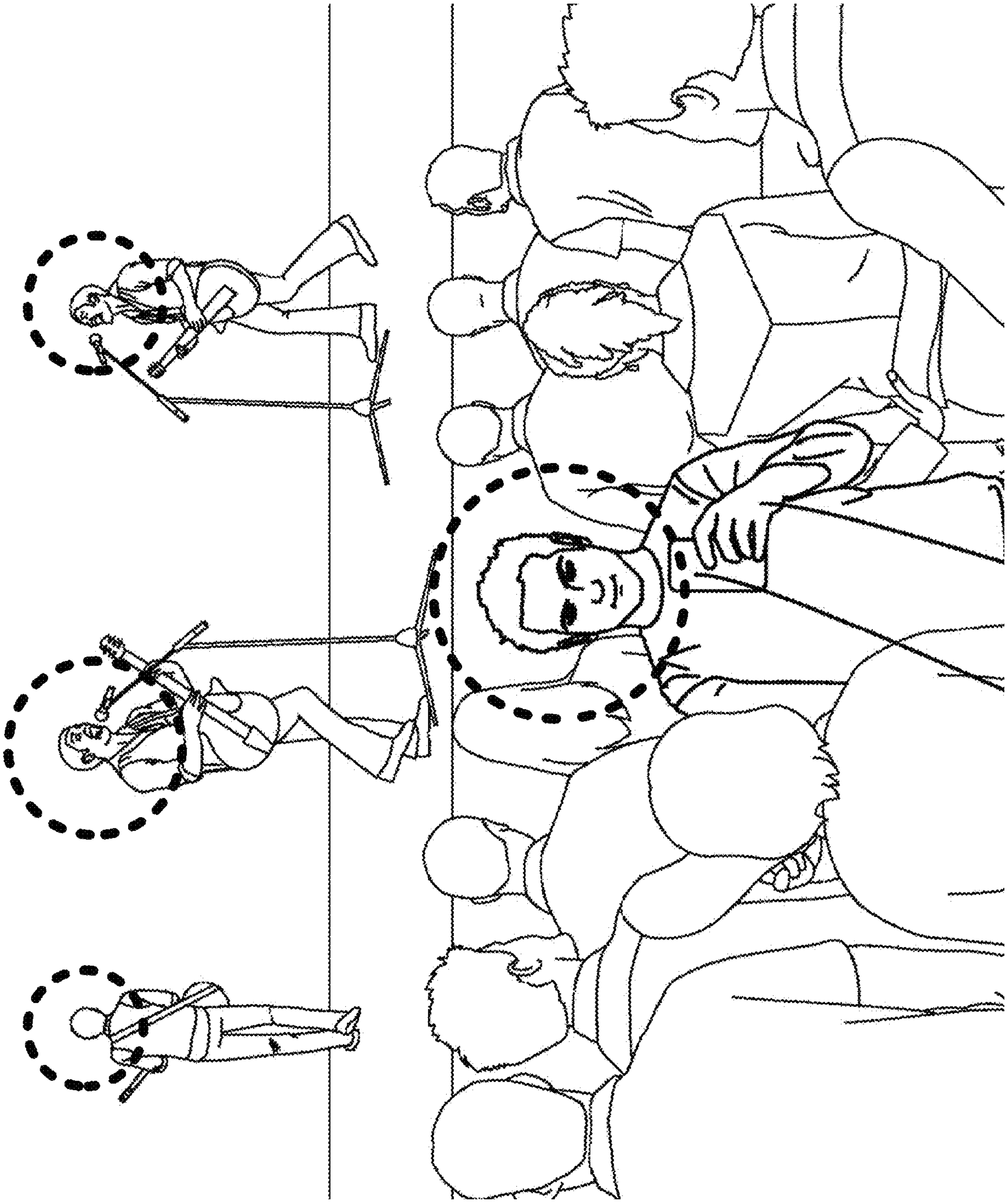
FIG. 10 shows examples of different levels of zooming and/or nulling for different hotspots.

An audio file or stream may include one or more versions of effects metadata, and different versions of such effects metadata may be provided for the same audio content (e.g., as user suggestions from a content generator). The different versions of effects metadata may provide, for example, different regions of focus for different audiences. In one example, different versions of effects metadata may describe effects of zooming in to different people (e.g., actors, athletes) in a video. A content creator may markup interesting audio sources and/or directions (e.g., different levels of zooming and/or nulling for different hotspots as depicted, for example, in FIG. 10), and a corresponding video stream may be configured to support user selection of a desired metadata stream by selecting a corresponding feature in the video stream. In another example, different versions of user-generated metadata may be shared via social media (e.g., for a live event having many different spectator perspectives such as, for example, an arena-scale musical event). Different versions of effects metadata may describe, for example, different alterations of the same soundfield to correspond to different video streams. Different versions of audio effect metadata bitstreams could be downloaded or streamed separately, possibly from a different source than the soundfield itself.

Effects metadata may be created by human direction (e.g., by a content creator) and/or automatically in accordance with one or more design criteria. In a teleconferencing application, for example, it may be desired to automatically select a single loudest audio source, or audio from multiple talking sources, and to deemphasize (e.g., discard or lower the volume of) other audio components of the soundfield. A corresponding effects metadata stream may include a flag to indicate a "meeting mode." In one example as shown in FIG. 3C, one or more of the possible values of an effect identifier field of the metadata (e.g., effect identifier ID10) is assigned to indicate selection of this mode. Parameters defining how the meeting mode is to be applied may include the number of sources to zoom into (e.g., the number of people at the conference table, the number of people to be speaking, etc.). The number of sources may be selected by an on-site user, by a content creator, and/or automatically. For example, face, motion, and/or person detection may be performed on one or more corresponding video streams to identify directions of interest and/or to support suppression of noise arriving from other directions.

Figure 11A:
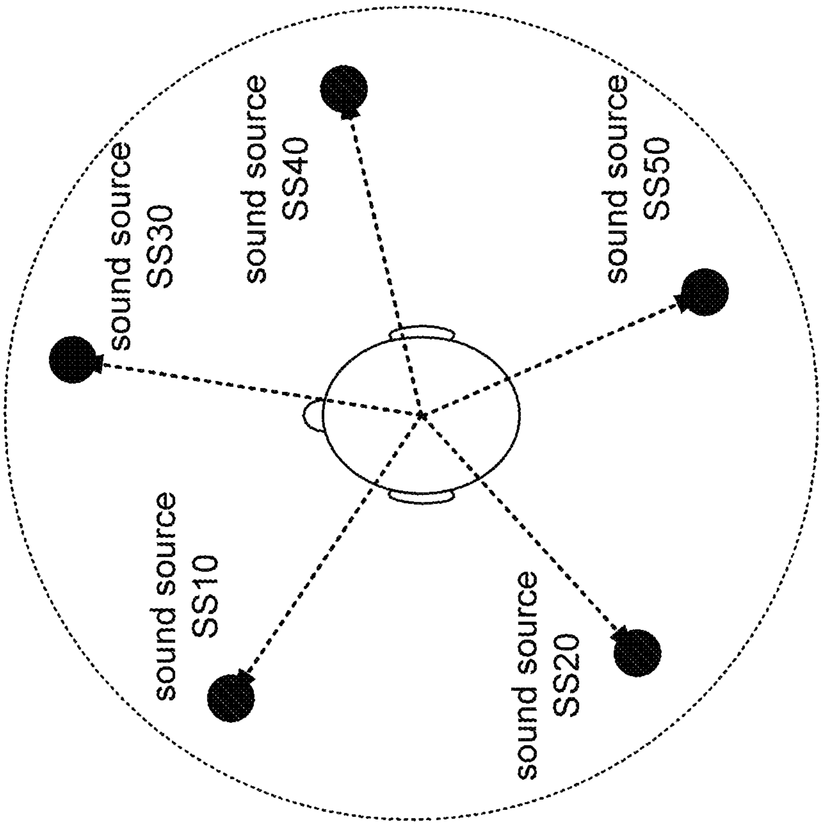
FIG. 11A shows an example of a soundfield that includes five sound sources surrounding a user position.
Figure 11B:
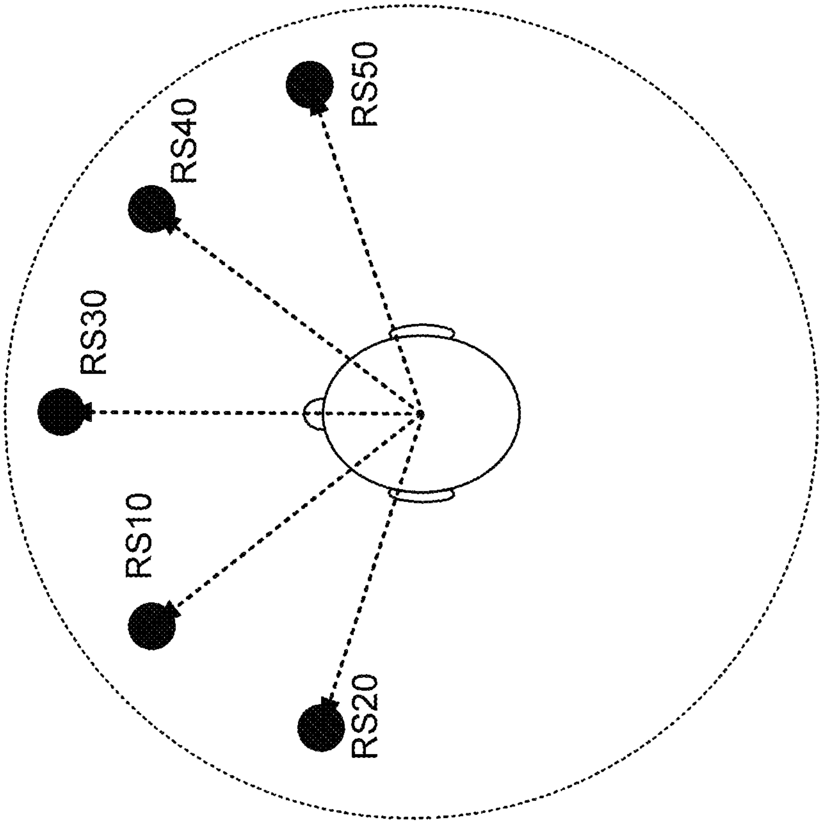
FIG. 11B shows a result of performing an angular compression operation on the soundfield of FIG. 11A.

Other parameters defining how a meeting mode is to be applied may include metadata to enhance extraction of the sources from the soundfield (e.g., beamformer weights, time frequency masking values, etc.). The metadata may also include one or more parameter values that indicate a desired rotation of the soundfield. The soundfield may be rotated according to the location of the loudest audio source: for example, to support auto-rotation of a remote user's video and audio so that the loudest speaker is in front of the remote user. In another example, the metadata may indicate auto-rotation of the soundfield so that a two-person discussion happens in front of the remote user. In a further example, the parameter values may indicate a compression (or other re-mapping) of the angular range of the soundfield as recorded (e.g., as shown in FIG. 11A) so that a remote participant may perceive the other attendees as being in front of her rather than behind her (e.g., as shown in FIG. 11B).

An audio effects metadata stream as described herein may be carried in the same transmission as the corresponding audio stream (or streams) or may be received in a separate transmission or even from a different source (e.g., as described above). In one example, the effects metadata stream is stored or transmitted in a dedicated extension payload (e.g., in the afx_data field as shown in FIG. 9D), which is an existing feature in the Advanced Audio Coding (AAC) codec (e.g. as defined in ISO/IEC 14496-3:2009) and more recent codecs. Data in such an extension payload may be processed by a device (e.g., a decoder and renderer) that understands this type of extension payload and may be ignored by other devices. In another example, an audio effects metadata stream as described herein may be standardized for audio or audiovisual codecs. Such an approach may be implemented, for example, as an amendment in the audio group as part of a standardized representation of an immersive environment (for example, MPEG-H (e.g., as described in Advanced Television Systems Committee (ATSC) Doc. A/342-3:2017) and/or MPEG-I (e.g., as described in ISO/IEC 23090)). In a further example, an audio effects metadata stream as described herein may be implemented in accordance with a coding-independent code points (CICP) specification. Further use cases for an audio effects metadata stream as described herein include encoding within an IVAS (Immersive Voice and Audio Services) codec (e.g., as part of a 3GPP implementation).

While described with respect to AAC, the techniques may be performed using any type of psychoacoustic audio coding that, as described in more detail below, allows for an extension payload and/or extension packets (e.g., fill elements or other containers of information that include an identifier followed by fill data) or otherwise allows for backward compatibility. Examples of other psychoacoustic audio codecs include Audio Codec 3 (AC-3), Apple Lossless Audio Codec (ALAC), MPEG-4 Audio Lossless Streaming (ALS), aptX®, enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

Figure 12A:
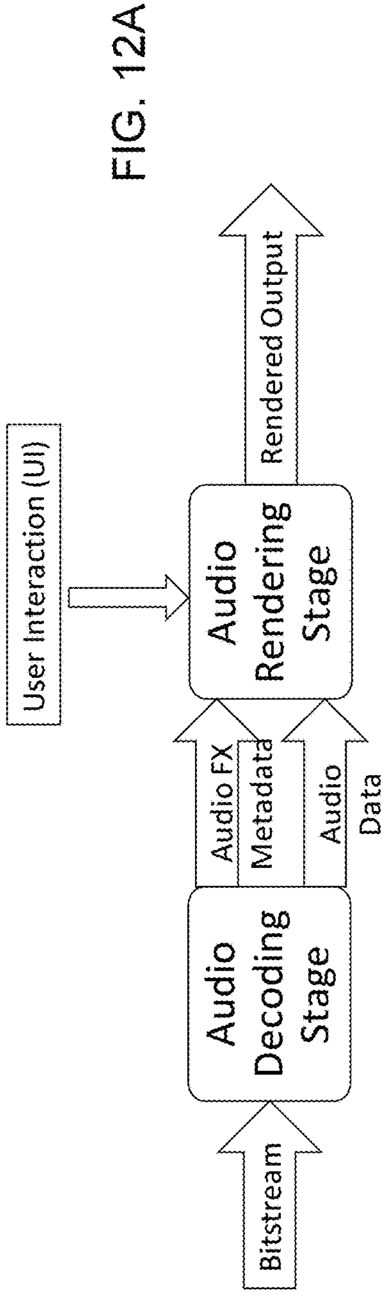
FIG. 12A shows a block diagram of a system according to a general configuration.

FIG. 12A shows a block diagram of a system for processing a bitstream that includes audio data and audio effects metadata as described herein. The system includes an audio decoding stage that is configured to parse the audio effect metadata (received, e.g., in an extension payload) and provide the metadata to an audio rendering stage. The audio rendering stage is configured to use the audio effect metadata to apply the audio effect as intended by the creator. The audio rendering stage may also be configured to receive user interaction to manipulate the audio effects and to take these user commands into account (if permitted).

Figure 12B:
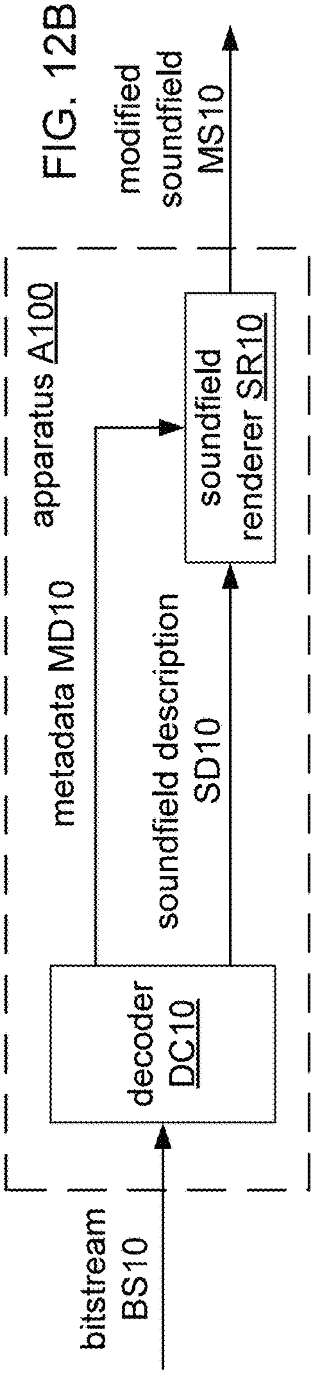
FIG. 12B shows a block diagram of an apparatus A100 according to a general configuration.

FIG. 12B shows a block diagram of an apparatus A100 according to a general configuration that includes a decoder DC10 and a soundfield renderer SR10. Decoder DC10 is configured to receive a bitstream BS10 that comprises metadata MD10 and a soundfield description SD10 (e.g., as described herein with respect to task T100) and to parse the metadata MD10 to obtain an effect identifier and at least one effect parameter value (e.g., as described herein with respect to task T200). Renderer SR10 is configured to apply, to the soundfield description SD10, an effect identified by the effect identifier (e.g., as described herein with respect to task T300) to generate a modified soundfield MS10. For example, renderer SR10 may be configured to use the at least one effect parameter value to apply the identified effect to the soundfield description SD10.

Renderer SR10 may be configured to apply a focus effect to the soundfield, for example, by rendering a selected region of the soundfield at a higher resolution than other regions, and/or by rendering other regions to have a higher diffusivity. In one example, an apparatus or device performing task T300 (e.g., renderer SR10) is configured to implement a focus effect by requesting additional information for the focus source or region (e.g., higher-order HOA coefficient values) from a server over a wired and/or wireless connection (e.g., Wi-Fi and/or LTE).

Renderer SR10 may be configured to apply a zoom effect to the soundfield, for example, by applying a beamformer (e.g., according to parameter values carried within a corresponding field of the metadata). Renderer SR10 may be configured to apply a rotation or translation effect to the soundfield, for example, by applying a corresponding matrix transformation to a set of HOA coefficients (or more generally, to a hierarchical set of basis function coefficients) and/or by moving audio objects within the soundfield accordingly.

Figure 12C:
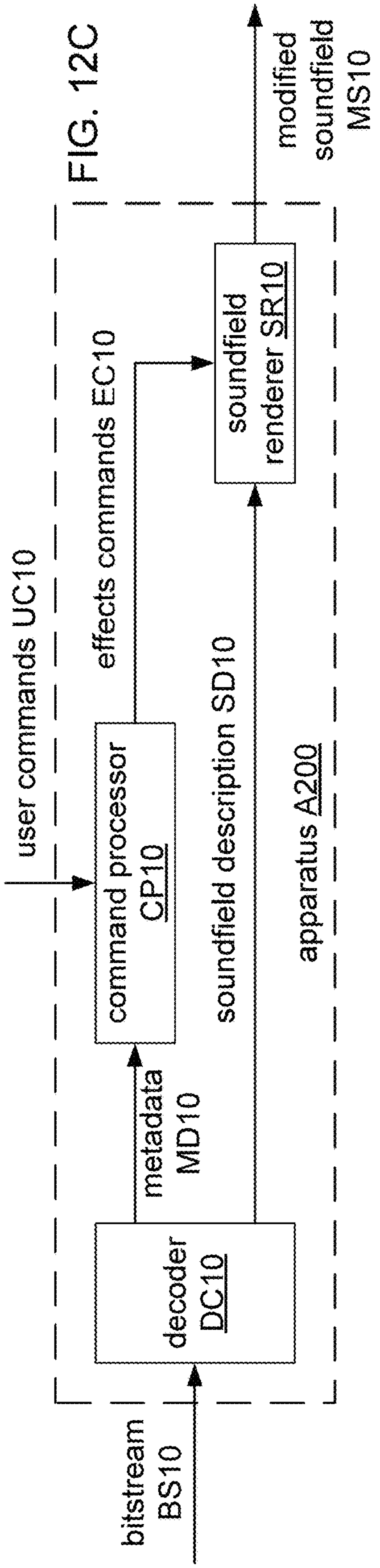
FIG. 12C shows a block diagram of an implementation A200 of apparatus A100.

FIG. 12C shows a block diagram of an implementation A200 of apparatus A100 that includes a command processor CP10. Processor CP10 is configured to receive the metadata MD10 and at least one user command UC10 as described herein and to produce at least one effects command EC10 that is based on the at least one user command UC10 and the at least one effect parameter value (e.g., in accordance with one or more restriction flags within the metadata). Renderer SR10 is configured to use the at least one effects command EC10 to apply the identified effect to the soundfield description SD10 to generate the modified soundfield MS10.

Figure 13A:
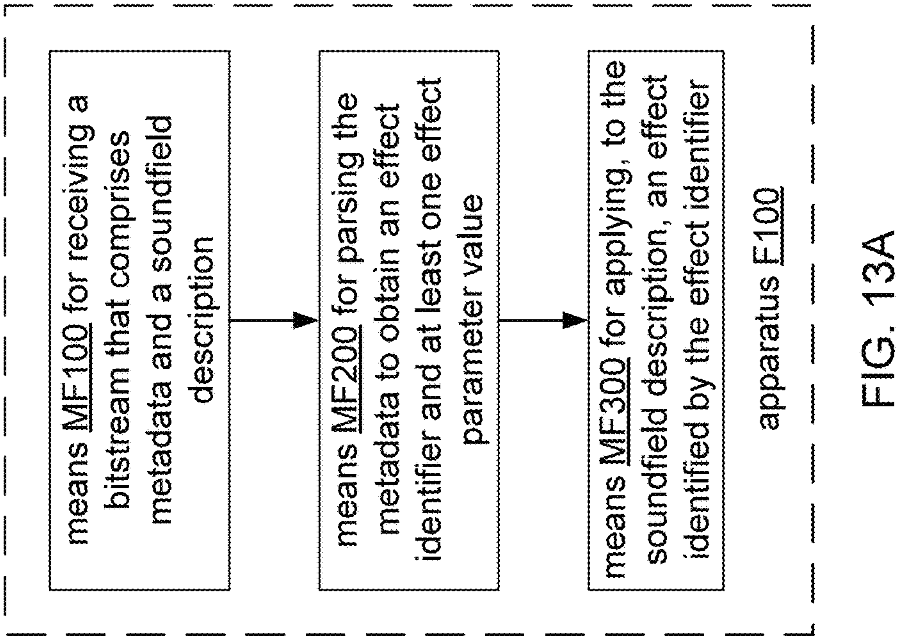
FIG. 13A shows a block diagram of an apparatus F100 according to a general configuration.

FIG. 13A shows a block diagram of an apparatus for manipulating a soundfield F100 according to a general configuration. Apparatus F100 includes means MF100 for receiving a bitstream that comprises metadata (e.g., one or more metadata streams) and a soundfield description (e.g., one or more audio streams) (e.g., as described herein with respect to task T100). For example, the means MF100 for receiving includes a transceiver, a modem, the decoder DC10, one or more other circuits or devices configured to receive the bitstream BS10, or a combination thereof. Apparatus F100 also includes means MF200 for parsing the metadata to obtain an effect identifier and at least one effect parameter value (e.g., as described herein with respect to task T200). For example, the means MF200 for parsing includes the decoder DC10, one or more other circuits or devices configured to parse the metadata MD10, or a combination thereof. Apparatus F100 also includes means MF300 for applying, to the soundfield description, an effect identified by the effect identifier (e.g., as described herein with respect to task T300). For example, means MF300 may be configured to apply the identified effect by using the at least one effect parameter value to apply a matrix transformation to the soundfield description. In some examples, the means MF300 for applying the effect includes the renderer SR10, the processor CP10, one or more other circuits or devices configured to apply the effect to the soundfield description SD10, or a combination thereof.

Figure 13B:
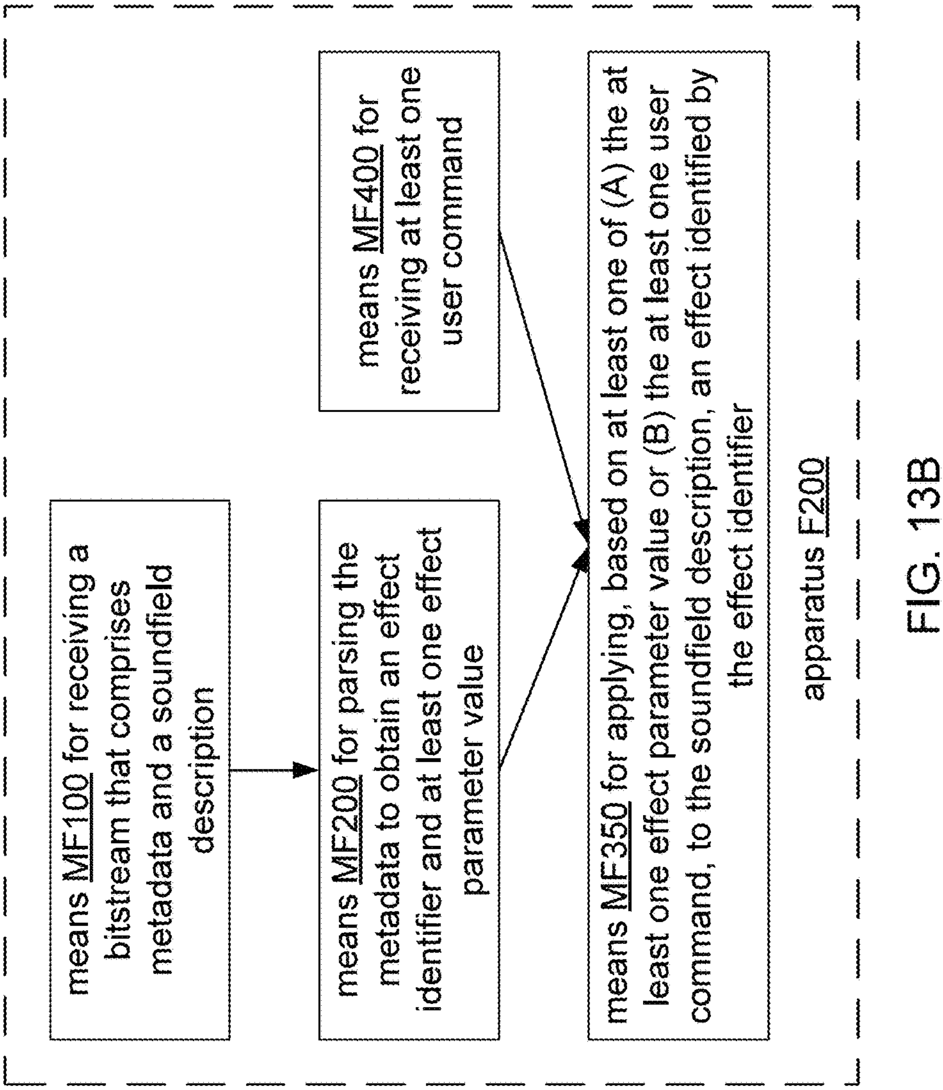
FIG. 13B shows a block diagram of an implementation F200 of apparatus F100.

FIG. 13B shows a block diagram of an implementation F200 of apparatus F100 that includes means MF400 for receiving at least one user command (e.g., by active and/or passive user interaction) (e.g., as described herein with respect to task T400). For example, the means MF400 for receiving at least one user command includes the processor CP10, one or more other circuits or devices configured to receive at least one user command UC10, or a combination thereof. Apparatus F200 also includes means MF350 (an implementation of means MF300) for applying, based on at least one of (A) the at least one effect parameter value or (B) the at least one user command, to the soundfield description, an effect identified by the effect identifier. In one example, means MF350 comprises means for combining the at least one effect parameter value with a user command to obtain at least one revised parameter. In another example, the parsing the metadata comprises parsing the metadata to obtain a second effect identifier, and means MF350 comprises means for determining to not apply, to the soundfield description, an effect identified by the second effect identifier. In some examples, the means MF350 for applying the effect includes the renderer SR10, the processor CP10, one or more other circuits or devices configured to apply the effect to the soundfield description SD10, or a combination thereof. Apparatus F200 may be embodied, for example, by an implementation of user tracking device UT10 that receives the audio and metadata streams and produces corresponding audio to the user via headphones.

Hardware for virtual reality (VR) may include one or more screens to present a visual scene to a user, one or more sound-emitting transducers (e.g., an array of loudspeakers, or an array of head-mounted transducers) to provide a corresponding audio environment, and one or more sensors to determine a position, orientation, and/or movement of the user. User tracking device UT10 as shown in FIG. 8A is one example of a VR headset. To support an immersive experience, such a headset may detect an orientation of the user's head in three degrees of freedom (3DOF)—rotation of the head around a top-to-bottom axis (yaw), inclination of the head in a front-to-back plane (pitch), and inclination of the head in a side-to-side plane (roll)—and adjust the provided audio environment accordingly.

Computer-mediated reality systems are being developed to allow computing devices to augment or add to, remove or subtract from, substitute or replace, or generally modify existing reality as experienced by a user. Computer-mediated reality systems may include, as a couple of examples, virtual reality (VR) systems, augmented reality (AR) systems, and mixed reality (MR) systems. The perceived success of computer-mediated reality systems are generally related to the ability of such systems to provide a realistically immersive experience in terms of both video and audio such that the video and audio experiences align in a manner that is perceived as natural and expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

Figure 15:
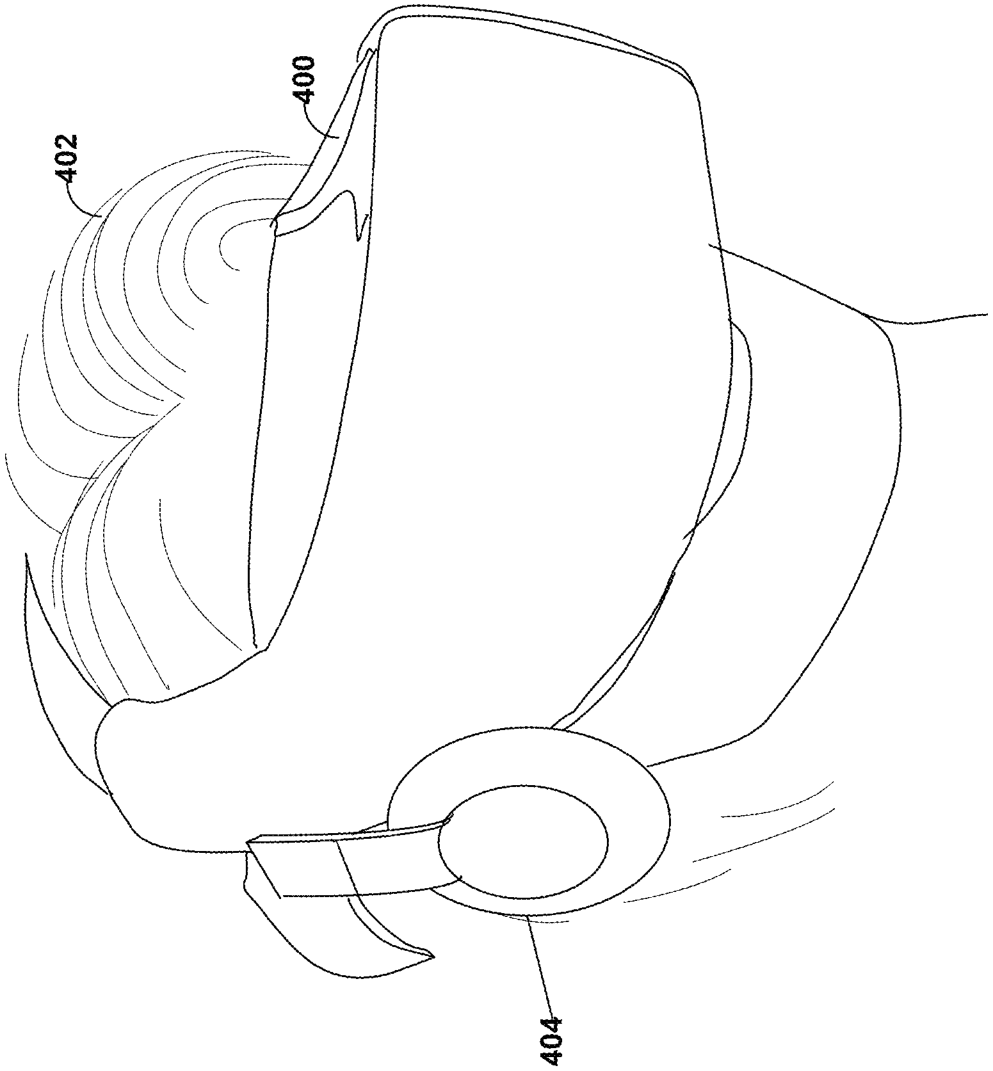
FIG. 15 shows an example 400 of a VR device.

In VR technologies, virtual information may be presented to a user using a head-mounted display such that the user may visually experience an artificial world on a screen in front of their eyes. In AR technologies, the real-world is augmented by visual objects that may be superimposed (e.g., overlaid) on physical objects in the real world. The augmentation may insert new visual objects and/or mask visual objects in the real-world environment. In MR technologies, the boundary between what is real or synthetic/virtual and visually experienced by a user is becoming difficult to discern. Techniques as described herein may be used with a VR device 400 as shown in FIG. 15 to improve an experience of a user 402 of the device via headphones 404 of the device.

Video, audio, and other sensory data may play important roles in the VR experience. To participate in a VR experience, the user 402 may wear the VR device 400 (which may also be referred to as a VR headset 400) or other wearable electronic device. The VR client device (such as the VR headset 400) may track head movement of the user 402, and adapt the video data shown via the VR headset 400 to account for the head movements, providing an immersive experience in which the user 402 may experience a virtual world shown in the video data in visual three dimensions.

While VR (and other forms of AR and/or MR) may allow the user 402 to reside in the virtual world visually, often the VR headset 400 may lack the capability to place the user in the virtual world audibly. In other words, the VR system (which may include a computer responsible for rendering the video data and audio data—that is not shown in the example of FIG. 15 for ease of illustration purposes, and the VR headset 400) may be unable to support full three-dimensional immersion audibly (and in some instances realistically in a manner that reflects the virtual scene displayed to the user via the VR headset 400).

Though full three-dimensional audible rendering still poses challenges, the techniques in this disclosure enable a further step towards that end. Audio aspects of AR, MR, and/or VR may be classified into three separate categories of immersion. The first category provides the lowest level of immersion and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational (and orientational) head movements in which the head is not centered on the optical and acoustical center of the soundfield.

The second category, referred to 3DOF plus (or "3DOF+ "), provides for the three degrees of freedom (yaw, pitch, and roll) in addition to limited spatial translational (and orientational) movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of a person in space (x, y, and z translations). The spatial translations may be induced, for example, by sensors tracking the location of the person in the physical world, by way of an input controller, and/or by way of a rendering program that simulates transportation of the user within the virtual space.

Audio aspects of VR may be less immersive than the video aspects, thereby potentially reducing the overall immersion experienced by the user. With advances in processors and wireless connectivity, however, it may be possible to achieve 6DOF rendering with wearable AR, MR and/or VR devices. Moreover, in the future it may be possible to take into account movement of a vehicle that has the capabilities of AR, MR and/or VR devices and provide an immersive audio experience. In addition, a person of ordinary skill would recognize that a mobile device (e.g., a handset, smartphone, tablet) may also implement VR, AR, and/or MR techniques.

In accordance with the techniques described in this disclosure, various ways by which to adjust audio data (whether in an audio channel format, an audio object format, and/or an audio scene-based format) may allow for 6DOF audio rendering. 6DOF rendering provides a more immersive listening experience by rendering audio data in a manner that accounts for the three degrees of freedom in term of head movements (yaw, pitch, and roll) and also for translational movements (e.g., in a spatial three-dimensional coordinate system—x, y, z). In implementation, where the head movements may not be centered on the optical and acoustical center, adjustments may be made to provide for 6DOF rendering, and not necessarily be limited to spatial two-dimensional coordinate systems. As disclosed herein, the following figures and descriptions allow for 6DOF audio rendering.

Figure 16:
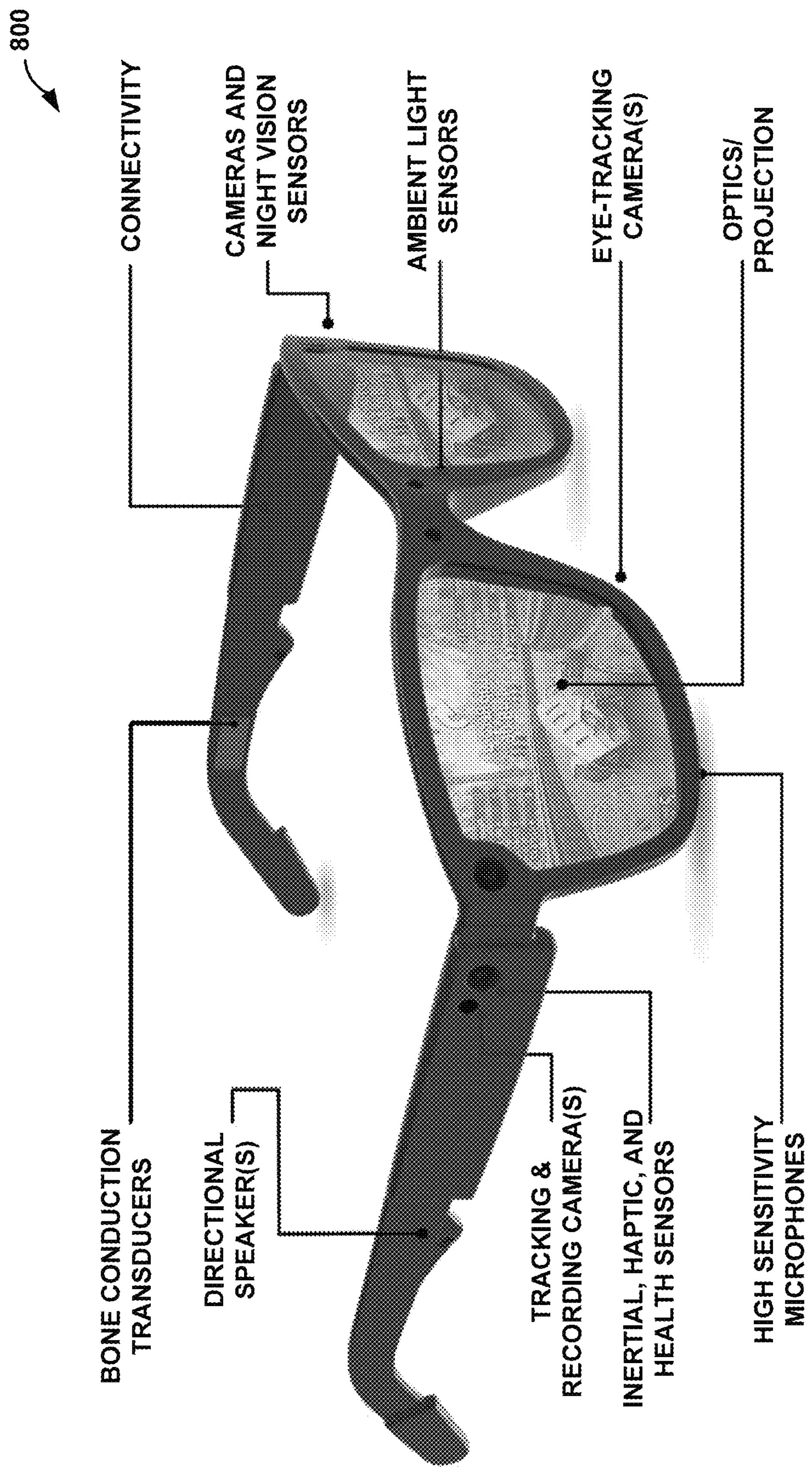
FIG. 16 is a diagram illustrating an example of an implementation 800 of a wearable device.

FIG. 16 is a diagram illustrating an example of an implementation 800 of a wearable device that may operate in accordance with various aspect of the techniques described in this disclosure. In various examples, the wearable device 800 may represent a VR headset (such as the VR headset 400 described above), an AR headset, an MR headset, or an extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may refer to a catchall term for VR, AR, and MR.

The wearable device 800 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 800 may communicate with the computing device supporting the wearable device 800 via a wired connection or a wireless connection.

In some instances, the computing device supporting the wearable device 800 may be integrated within the wearable device 800 and as such, the wearable device 800 may be considered as the same device as the computing device supporting the wearable device 800. In other instances, the wearable device 800 may communicate with a separate computing device that may support the wearable device 800. In this respect, the term "supporting" should not be understood to require a separate dedicated device but that one or more processors configured to perform various aspects of the techniques described in this disclosure may be integrated within the wearable device 800 or integrated within a computing device separate from the wearable device 800.

For example, when the wearable device 800 represents the VR device 400, a separate dedicated computing device (such as a personal computer including one or more processors) may render the audio and visual content, while the wearable device 800 may determine the translational head movement upon which the dedicated computing device may render, based on the translational head movement, the audio content (as the speaker feeds) in accordance with various aspects of the techniques described in this disclosure. As another example, when the wearable device 800 represents smart glasses, the wearable device 800 may include the processor (e.g., one or more processors) that both determines the translational head movement (by interfacing within one or more sensors of the wearable device 800) and renders, based on the determined translational head movement, the loudspeaker feeds.

As shown, the wearable device 800 includes a rear camera, one or more directional speakers, one or more tracking and/or recording cameras, and one or more light-emitting diode (LED) lights. In some examples, the LED light(s) may be referred to as "ultra bright" LED light(s). In addition, the wearable device 800 includes one or more eye-tracking cameras, high sensitivity audio microphones, and optics/projection hardware. The optics/projection hardware of the wearable device 800 may include durable semi-transparent display technology and hardware.

The wearable device 800 also includes connectivity hardware, which may represent one or more network interfaces that support multimode connectivity, such as 4G communications, 5G communications, etc. The wearable device 800 also includes ambient light sensors, and bone conduction transducers. In some instances, the wearable device 800 may also include one or more passive and/or active cameras with fisheye lenses and/or telephoto lenses. The steering angle of the wearable device 800 may be used to select an audio representation of a soundfield (e.g., one of mixed-order ambisonics (MOA) representations) to output via the directional speaker(s)—headphones 404—of the wearable device 800, in accordance with various techniques of this disclosure. It will be appreciated that the wearable device 800 may exhibit a variety of different form factors.

Although not shown in the example of FIG. 16, wearable device 800 may include an orientation/translation sensor unit, such as a combination of a microelectromechanical system (MEMS) for sensing, or any other type of sensor capable of providing information in support of head and/or body tracking. In one example, the orientation/translation sensor unit may represent the MEMS for sensing translational movement similar to those used in cellular phones, such as so-called "smartphones."

Although described with respect to particular examples of wearable devices, a person of ordinary skill in the art would appreciate that descriptions related to FIGS. 15 and 16 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 17:
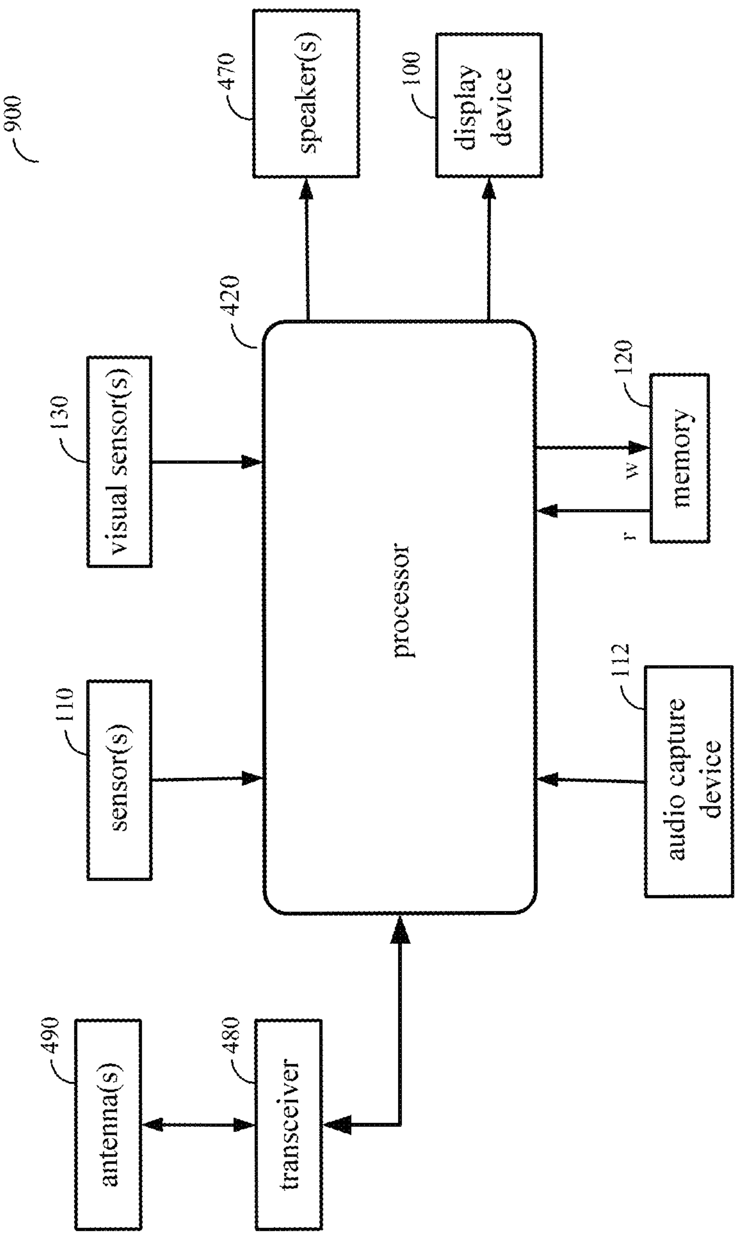
FIG. 17 shows a block diagram of a system 900 that may be implemented within a device.

FIG. 17 shows a block diagram of a system 900 that may be implemented within a device (e.g., wearable device 400 or 800). System 900 includes a processor 420 (e.g., one or more processors) that may be configured to perform method M100 or M200 as described herein. System 900 also includes a memory 120 coupled to processor 420, sensors 110 (e.g., ambient light sensors of device 800, orientation and/or tracking sensors), visual sensors 130 (e.g., night vision sensors, tracking and recording cameras, eye-tracking cameras, and rear camera of device 800), display device 100 (e.g., optics/projection of device 800), audio capture device 112 (e.g., high-sensitivity microphones of device 800), loudspeakers 470 (e.g., headphones 404 of device 400, directional speakers of device 800), transceiver 480, and antennas 490. In a particular aspect, the system 900 includes a modem in addition to or as an alternative to the transceiver 480. For example, the modem, the transceiver 480, or both, are configured to receive a signal representing the bitstream BS10 and to provide the bitstream BS10 to the decoder DC10.

The various elements of an implementation of an apparatus or system as disclosed herein (e.g., apparatus A100, A200, F100, and/or F200) may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M200 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein (e.g., methods M100 and/or M200) may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary aspects, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method of characterizing portions of a soundfield as described herein. Further examples of such a storage medium include a medium further comprising code which, when executed by the at least one processor, causes the at least one processor to receive a bitstream that comprises metadata and a soundfield description (e.g., as described herein with reference to task T100); parse the metadata to obtain an effect identifier and at least one effect parameter (e.g., as described herein with reference to task T200); and apply, to the soundfield description, an effect identified by the effect identifier (e.g., as described herein with reference to task T300). The applying may include using the at least one effect parameter to apply the identified effect to the soundfield description.

Implementation examples are described in the following numbered clauses:

Clause 1. A method of manipulating a soundfield, the method comprising: receiving a bitstream that comprises metadata and a soundfield description; parsing the metadata to obtain an effect identifier and at least one effect parameter value; and applying, to the soundfield description, an effect identified by the effect identifier.

Clause 2. The method of clause 1, wherein the parsing the metadata comprises parsing the metadata to obtain a timestamp corresponding to the effect identifier, and wherein the applying the identified effect comprises using the at least one effect parameter value to apply the identified effect to a portion of the soundfield description that corresponds to the timestamp.

Clause 3. The method of clause 1, wherein the applying the identified effect comprises combining the at least one effect parameter value with a user command to obtain at least one revised parameter value.

Clause 4. The method of any of clauses 1 to 3, wherein the applying the identified effect comprises rotating the soundfield to a desired orientation.

Clause 5. The method of any of clauses 1 to 3, wherein the at least one effect parameter value includes an indicated direction, and wherein the applying the identified effect comprises using the at least one effect parameter value to rotate the soundfield to the indicated direction.

Clause 6. The method of any of clauses 1 to 3, wherein the at least one effect parameter value includes an indicated direction, and wherein the applying the identified effect comprises using the at least one effect parameter value to increase an acoustic level of the soundfield in the indicated direction, relative to an acoustic level of the soundfield in other directions.

Clause 7. The method of any of clauses 1 to 3, wherein the at least one effect parameter value includes an indicated direction, and wherein the applying the identified effect comprises using the at least one effect parameter value to reduce an acoustic level of the soundfield in the indicated direction, relative to an acoustic level of the soundfield in other directions.

Clause 8. The method of any of clauses 1 to 3, wherein the at least one effect parameter value indicates a location within the soundfield, and wherein the applying the identified effect comprises using the at least one effect parameter value to translate a sound source to the indicated location.

Clause 9. The method of any of clauses 1 to 3, wherein the at least one effect parameter value includes an indicated direction, and wherein the applying the identified effect comprises using the at least one effect parameter value to increase a directionality of at least one of a sound source of the soundfield or a region of the soundfield, relative to another sound source of the soundfield or the region of the soundfield.

Clause 10. The method of any of clauses 1 to 3, wherein the applying the identified effect comprises applying a matrix transformation to the soundfield description.

Clause 11. The method of clause 10, wherein the matrix transformation comprises at least one of a rotation of the soundfield and a translation of the soundfield.

Clause 12. The method of any of clauses 1 to 3, wherein the soundfield description comprises a hierarchical set of basis function coefficients.

Clause 13. The method of any of clauses 1 to 3, wherein the soundfield description comprises a plurality of audio objects.

Clause 14. The method of any of clauses 1 to 3, wherein the parsing the metadata comprises parsing the metadata to obtain a second effect identifier, and wherein the method comprises determining to not apply, to the soundfield description, an effect identified by the second effect identifier.

Clause 15. An apparatus for manipulating a soundfield, the apparatus comprising: a decoder configured to receive a bitstream that comprises metadata and a soundfield description and to parse the metadata to obtain an effect identifier and at least one effect parameter value; and a renderer configured to apply, to the soundfield description, an effect identified by the effect identifier.

Clause 16. The apparatus of clause 15, further comprising a modem configured to: receive a signal that represents the bitstream; and provide the bitstream to the decoder.

Clause 17. A device for manipulating a soundfield, the device comprising: a memory configured to store a bitstream that comprises metadata and a soundfield description; and a processor coupled to the memory and configured to: parse the metadata to obtain an effect identifier and at least one effect parameter value; and apply, to the soundfield description, an effect identified by the effect identifier.

Clause 18. The device of clause 17, wherein the processor is configured to parse the metadata to obtain a timestamp corresponding to the effect identifier, and to apply the identified effect by using the at least one effect parameter value to apply the identified effect to a portion of the soundfield description that corresponds to the time stamp.

Clause 19. The device of clause 17, wherein the processor is configured to combine the at least one effect parameter value with a user command to obtain at least one revised parameter.

Clause 20. The device of any of clauses 17 to 19, wherein the at least one effect parameter value includes an indicated direction, and wherein the processor is configured to apply the identified effect by using the at least one effect parameter value to rotate the soundfield to the indicated direction.

Clause 21. The device of any of clauses 17 to 19, wherein the at least one effect parameter value includes an indicated direction, and wherein the processor is configured to apply the identified effect by using the at least one effect parameter value to increase an acoustic level of the soundfield in the indicated direction, relative to an acoustic level of the soundfield in other directions.

Clause 22. The device of any of clauses 17 to 19, wherein the at least one effect parameter value includes an indicated direction, and wherein the processor is configured to apply the identified effect by using the at least one effect parameter value to reduce an acoustic level of the soundfield in the indicated direction, relative to an acoustic level of the soundfield in other directions.

Clause 23. The device of any of clauses 17 to 19, wherein the at least one effect parameter value indicates a location within the soundfield, and wherein the processor is configured to apply the identified effect by using the at least one effect parameter value to translate a sound source to the indicated location.

Clause 24. The device of any of clauses 17 to 19, wherein the at least one effect parameter value includes an indicated direction, and wherein the processor is configured to apply the identified effect by using the at least one effect parameter value to increase a directionality of at least one of a sound source of the soundfield or a region of the soundfield, relative to another sound source of the soundfield or region of the soundfield.

Clause 25. The device of any of clauses 17 to 19, wherein the processor is configured to apply the identified effect by using the at least one effect parameter value to apply a matrix transformation to the soundfield description.

Clause 26. The device of clause 25, wherein the matrix transformation comprises at least one of a rotation of the soundfield and a translation of the soundfield.

Clause 27. The device of any of clauses 17 to 19, wherein the soundfield description comprises a hierarchical set of basis function coefficients.

Clause 28. The device of any of clauses 17 to 19, wherein the soundfield description comprises a plurality of audio objects.

Clause 29. The device of any of clauses 17 to 19, wherein the processor is configured to parse the metadata to obtain a second effect identifier, and to determine to not apply, to the soundfield description, an effect identified by the second effect identifier.

Clause 30. The device of any of clauses 17 to 19, wherein the device comprises an application-specific integrated circuit that includes the processor.

Clause 31. An apparatus for manipulating a soundfield, the apparatus comprising: means for receiving a bitstream that comprises metadata and a soundfield description; means for parsing the metadata to obtain an effect identifier and at least one effect parameter value; and means for applying, to the soundfield description, an effect identified by the effect identifier.

Clause 32. The apparatus of clause 31, wherein at least one of the means for receiving, the means for parsing, or the means for applying is integrated in at least one of a mobile phone, a tablet computer device, a wearable electronic device, a camera device, a virtual reality headset, an augmented reality headset, or a vehicle.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of manipulating a soundfield, the method comprising:

receiving a bitstream that comprises metadata and a soundfield description, the metadata including a first effect identifier that designates a type of first effect to apply to the soundfield description and at least one effect parameter value that defines how to apply the effect, and including a second effect identifier that designates a type of second effect to apply to the soundfield description;

parsing the metadata to obtain the first effect identifier, the second effect identifier, and the at least one effect parameter value;

determining to not apply, to the soundfield description, the second effect identified by the second effect identifier; and applying, to the soundfield description, the first effect identified by the first effect identifier.

2. The method of claim 1, wherein the parsing the metadata comprises parsing the metadata to obtain a timestamp corresponding to the first effect identifier, and wherein the applying the first effect comprises using the at least one effect parameter value to apply the first effect to a portion of the soundfield description that corresponds to the timestamp.

3. The method of claim 1, wherein the applying the first effect comprises combining the at least one effect parameter value with a user command to obtain at least one revised parameter value.

4. The method of claim 1, wherein the applying the first effect comprises rotating the soundfield to a desired orientation.

5. The method of claim 1, wherein the at least one effect parameter value includes an indicated direction, and wherein the applying the first effect comprises using the at least one effect parameter value to rotate the soundfield to the indicated direction.

6. The method of claim 1, wherein the at least one effect parameter value includes an indicated direction, and wherein the applying the first effect comprises using the at least one effect parameter value to increase an acoustic level of the soundfield in the indicated direction, relative to an acoustic level of the soundfield in other directions.

7. The method of claim 1, wherein the at least one effect parameter value includes an indicated direction, and wherein the applying the first effect comprises using the at least one effect parameter value to reduce an acoustic level of the soundfield in the indicated direction, relative to an acoustic level of the soundfield in other directions.

8. The method of claim 1, wherein the at least one effect parameter value indicates a location within the soundfield, and wherein the applying the first effect comprises using the at least one effect parameter value to translate a sound source to the indicated location.

9. The method of claim 1, wherein the at least one effect parameter value includes an indicated direction, and wherein the applying the first effect comprises using the at least one effect parameter value to increase a directionality of at least one of a sound source of the soundfield or a region of the soundfield, relative to another sound source of the soundfield or the region of the soundfield.

10. The method of claim 1, wherein the applying the first effect comprises applying a matrix transformation to the soundfield description.

11. The method of claim 10, wherein the matrix transformation comprises at least one of a rotation of the soundfield and a translation of the soundfield.

12. The method of claim 1, wherein the soundfield description comprises a hierarchical set of basis function coefficients.

13. The method of claim 1, wherein the soundfield description comprises a plurality of audio objects.

14. An apparatus for manipulating a soundfield, the apparatus comprising:

a decoder configured to receive a bitstream that comprises metadata and a soundfield description, the metadata including a first effect identifier that designates a type of first effect to apply to the soundfield description and at least one effect parameter value that defines how to apply the effect, and including a second effect identifier that designates a type of second effect to apply to the soundfield description, and to parse the metadata to obtain the first effect identifier, the second effect identifier, and the at least one effect parameter value, and determine to not apply, to the soundfield description, the second effect identified by the second effect identifier; and a renderer configured to apply, to the soundfield description, the first effect identified by the first effect identifier.

15. The apparatus of claim 14, further comprising a modem configured to:

receive a signal that represents the bitstream; and provide the bitstream to the decoder.

16. A device for manipulating a soundfield, the device comprising:

a memory configured to store a bitstream that comprises metadata and a soundfield description, the metadata including a first effect identifier that designates a type of first effect to apply to the soundfield description and at least one effect parameter value that defines how to apply the effect, and including a second effect identifier that designates a type of second effect to apply to the soundfield description; and a processor coupled to the memory and configured to:

parse the metadata to obtain the first effect identifier, the second effect identifier, and the at least one effect parameter value;

determine to not apply, to the soundfield description, the second effect identified by the second effect identifier; and apply, to the soundfield description, the first effect identified by the first effect identifier.

17. The device of claim 16, wherein the processor is configured to parse the metadata to obtain a timestamp corresponding to the first effect identifier, and to apply the first effect by using the at least one effect parameter value to apply the first effect to a portion of the soundfield description that corresponds to the timestamp.

18. The device of claim 16, wherein the processor is configured to combine the at least one effect parameter value with a user command to obtain at least one revised parameter.

19. The device of claim 16, wherein the at least one effect parameter value includes an indicated direction, and wherein the processor is configured to apply the first effect by using the at least one effect parameter value to rotate the soundfield to the indicated direction.

20. The device of claim 16, wherein the at least one effect parameter value includes an indicated direction, and wherein the processor is configured to apply the first effect by using the at least one effect parameter value to increase an acoustic level of the soundfield in the indicated direction, relative to an acoustic level of the soundfield in other directions.

21. The device of claim 16, wherein the at least one effect parameter value includes an indicated direction, and wherein the processor is configured to apply the first effect by using the at least one effect parameter value to reduce an acoustic level of the soundfield in the indicated direction, relative to an acoustic level of the soundfield in other directions.

22. The device of claim 16, wherein the at least one effect parameter value indicates a location within the soundfield, and wherein the processor is configured to apply the first effect by using the at least one effect parameter value to translate a sound source to the indicated location.

23. The device of claim 16, wherein the at least one effect parameter value includes an indicated direction, and wherein the processor is configured to apply the first effect by using the at least one effect parameter value to increase a directionality of at least one of a sound source of the soundfield or a region of the soundfield, relative to another sound source of the soundfield or region of the soundfield.

24. The device of claim 16, wherein the processor is configured to apply the first effect by using the at least one effect parameter value to apply a matrix transformation to the soundfield description.

25. The device of claim 24, wherein the matrix transformation comprises at least one of a rotation of the soundfield and a translation of the soundfield.

26. The device of claim 16, wherein the soundfield description comprises a hierarchical set of basis function coefficients.

27. The device of claim 16, wherein the soundfield description comprises a plurality of audio objects.

28. The device of claim 16, wherein the device comprises an application-specific integrated circuit that includes the processor.

* * * * *